US012228338B2

(12) United States Patent
Chun et al.

(10) Patent No.: US 12,228,338 B2
(45) Date of Patent: Feb. 18, 2025

(54) RF TREATMENT SYSTEMS AND METHODS

(71) Applicant: Ziel Equipment, Sales and Services, Inc., San Francisco, CA (US)

(72) Inventors: Hon Ming Chun, Lexington, MA (US); Parastoo Yaghmaee, Davis, CA (US); Nathanial G. Smalley, Cedar Rapids, IA (US); Zakiul Kabir, Portland, OR (US)

(73) Assignee: ZIEL EQUIPMENT, SALES AND SERVICES, INC., San Francisco, CA (US)

( * ) Notice: Subject to any disclaimer, the term of this patent is extended or adjusted under 35 U.S.C. 154(b) by 795 days.

(21) Appl. No.: 17/445,581

(22) Filed: Aug. 20, 2021

(65) Prior Publication Data

US 2022/0057138 A1 Feb. 24, 2022

Related U.S. Application Data

(60) Provisional application No. 63/068,852, filed on Aug. 21, 2020.

(51) Int. Cl.

*F26B 3/30* (2006.01)
*H05B 6/54* (2006.01)
*H05B 6/64* (2006.01)
*H05B 6/68* (2006.01)
*H05B 6/80* (2006.01)

(52) U.S. Cl.

CPC ................. *F26B 3/30* (2013.01); *H05B 6/54* (2013.01); *H05B 6/6455* (2013.01); *H05B 6/68* (2013.01); *H05B 6/80* (2013.01)

(58) Field of Classification Search

CPC ........... F26B 3/30; H05B 6/54; H05B 6/6455; H05B 6/68; H05B 6/80
USPC ........................................................... 34/245
See application file for complete search history.

(56) References Cited

U.S. PATENT DOCUMENTS 5,939,116 A * 8/1999 Ono ...................... F26B 25/063 34/267
6,272,768 B1 * 8/2001 Danese ............. H01L 21/67086 34/76
7,334,346 B2 * 2/2008 Nomine .................... F26B 5/06 34/92
8,240,213 B2 * 8/2012 Donaty .................... G01N 1/38 73/863
8,445,034 B1 * 5/2013 Coles, Jr. ............. A61K 31/192 424/725
9,470,455 B2 * 10/2016 Stanish ................... F26B 21/08
9,879,908 B2 * 1/2018 Triglia, Jr. .............. F26B 3/347
10,517,308 B2 * 12/2019 Rehkopf .................. A23L 3/04
11,160,891 B2 11/2021 Eades (Continued)

OTHER PUBLICATIONS

Chun, H. et al., "RF Treatment Systems and Methods," U.S. Appl. No. 17/445,579, filed Aug. 20, 2021, 102 pages.

*Primary Examiner* — Stephen M Gravini
(74) *Attorney, Agent, or Firm* — McCoy Russell LLP

(57) ABSTRACT

Methods and systems are provided for applying RF power as part of an RF treatment. Starting the RF treatment may include treating a product positioned within an RF chamber with RF waves. The RF treatment may include estimating a log kill of the product during the RF treatment and terminating the RF treatment responsive to the estimated log kill reaching a log kill threshold.

20 Claims, 17 Drawing Sheets

(56) References Cited

U.S. PATENT DOCUMENTS

| | | | | |
|---|---|---|---|---|
| 11,841,189 | B1 * | 12/2023 | Andrews ............... | F26B 21/004 |
| 2022/0057138 | A1 * | 2/2022 | Chun, Phd ................ | F26B 3/30 |
| 2022/0061134 | A1 * | 2/2022 | Chun ........................ | F26B 3/30 |

* cited by examiner

FIG. 12A

1200

| Scenario No. | Control Temp. Mode (1202) | Treatment Temp. Mode (1204) | Potential Target Setting Strategy (1206) | Spread Limit for Equilibration (1208) | Scenario Comment (1210) | Driver for Control Target (1212) | Driver for Treatment Target (1214) |
|---|---|---|---|---|---|---|---|
| 1 | Min | Min | Set control target slightly above treatment target. Setting too high will lead to unnecessary quality damage and violate the controllability principle. Setting below treatment target would violate convergence principle. | Set higher than typical spread | | Treatment target | Target pathogen |
| 2 | | | | Set close to typical/ expected spread | | | |
| 3 | | | | Set lower than typical spread | | | |
| 4 | Avg | Min | Set control target above treatment target by around half of the typical spread | Set higher than typical spread | | Treatment target and typical spread | Target pathogen |
| 5 | | | | Set slightly less than double the control-treatment differential | Identical to scenario 8 | | |
| 6 | | | | Set lower than typical spread | | | |
| 7 | | | Set control target above treatment target by slightly more than half of the specified spread limit | Set higher than typical spread | | Treatment target and allowed spread | Target pathogen |
| 8 | | | | Set close to typical/ expected spread | Identical to scenario 5 | | |
| 9 | | | | Set lower than typical spread | | | |
| 10 | Max | Min | Set control target at "not-to-exceed" quality retention temp. Set treatment target by target pathogen. Set duration by desired log kill. Set spread limit to be lower than control-treatment differential. | Higher than typical spread | | Quality retention limit | Target pathogen |
| 11 | | | | Close to typical/expected spread | | | |
| 12 | | | | Lower than typical spread | | | |
| 13 | | | Set treatment target by log kill goal. Set control target by slightly more than the spread limit above treatment target | Higher than typical spread | | Treatment target and allowed spread | Target pathogen |
| 14 | | | | Close to typical/expected spread | | | |
| 15 | | | | Lower than typical spread | | | |
| 16 | Min | Avg | Violates one or more principles, specific principle depending on settings | | | | |

FIG. 12B

1201

| Scenario No. | Driver for Spread Limit (1216) | Frequency of Meeting Treatment Target (1218) | Likelihood of Equilibration (1220) | Uncertainty: Upside (1222) |
|---|---|---|---|---|
| 1 | Cycle time | Very high | Low | Low actual spread will have better quality retention |
| 2 | | High | Normal | Low actual spread will have better quality retention and no impact on process time |
| 3 | Quality retention | Moderate high | High | Low actual spread will have better quality retention and no impact on process time |
| 4 | Cycle time | Moderate low | Low | Low actual spread will have better quality retention, higher microbial reduction and no impact on process time |
| 5 | | Moderate | Normal | Low actual spread will have better quality retention, higher microbial reduction and no impact on process time |
| 6 | Quality retention and microbial | Moderate | High | Low actual spread will have better quality retention, higher microbial reduction and no impact on process time |
| 7 | Cycle time | High | Low | Low actual spread will have higher microbial reduction and minimal equilibration time |
| 8 | | Moderate | Normal | Low actual spread will have better quality retention, higher microbial reduction and no impact on process time |
| 9 | Quality retention | Low | High | Low actual spread will have better quality retention, higher microbial reduction and reduced process time |
| 10 | Control-treatment differential | High | Low | Low actual spread will have much higher bioreduction |
| 11 | Control-treatment differential | Moderate | Normal | Low actual spread will have higher bioreduction |
| 12 | Control-treatment differential | Moderate low | High | Low actual spread will have desired bioreduction |
| 13 | Microbial reduction | High | Low | Low actual spread will have much higher bioreduction |
| 14 | | Moderate | Normal | Low actual spread will have higher bioreduction |
| 15 | Quality retention | Moderate low | High | Low actual spread will have slightly higher bioreduction |
| 16 | | | | |

FIG. 12C

1203

| Scenario No. | Uncertainty: Downside (1224) | Trade-off (1226) | Microbial Reduction (1228) | Quality Retention (1230) | Throughput (1232) |
|---|---|---|---|---|---|
| 1 | High actual spread may reduce quality | Trade-off between quality retention and cycle time; Minimum microbial reduction is assured | Most important | Not important | Important |
| 2 | High actual spread may lengthen process time | | Most important | Important | Slightly important |
| 3 | High actual spread will lengthen process time | | Most important | Most important | Not important |
| 4 | High actual spread may lead to non-convergence | Trade-off between cycle time and an equal share of microbial reduction and quality retention | N/A | N/A | N/A |
| 5 | High actual spread may slifhtly reduce qulity and lengthen process time | | Important | Important | Slightly important |
| 6 | High actual spread may slightly reduce qualitiy and lengthen process time | | Very important | Very important | Not important |
| 7 | High actual spread will reduce quality and slightly lengthen process time | Trade-off between cycle time and qulality retention. No impact on minimum microbial reduction. | Very important | Not important | Slightly important |
| 8 | High actual spread may slightly reduce quality and lengthen process time | | Important | Important | Slightly important |
| 9 | High actual spread may slightly reduce quality and lengthen process time | | Slightly important | Very important | Not important |
| 10 | High actual spread may lengthen process time | Achieving both quality retention and microbial reduction goals at the expense of longer cycle time. | Very important | Very important | Not important |
| 11 | High actual spread will lenthen process time | | Very important | Very important | Not important |
| 12 | High actual spread will significantly lengthen process time | | Very important | Very important | Not important |
| 13 | High actual spread may lengtehn process time | Achieving microbial reduction goals while trading off quality retention and cycle time. | Very important | Not important | Important |
| 14 | High actual spread will lengthen process time | | Very important | Slightly important | Slightly important |
| 15 | High actual spread will significantly lengthen process time | | Very important | Important | Not important |
| 16 | | | N/A | N/A | N/A |

FIG. 12D

1205

| Scenario No. | Control Temp. Mode (1202) | Treatment Temp. Mode (1204) | Potential Target Setting Strategy (1206) | Spread Limit for Equilibration (1208) | Scenario Comment (1210) | Driver for Control Target (1212) | Driver for Treatment Target (1214) |
|---|---|---|---|---|---|---|---|
| 17 | Avg | Avg | Set control target slightly above treatment target. Setting too high will lead to unnecessary quality damage. Setting below treatment target would violate convergence principle. | Set higher than typical spread | | Treatment target | Target pathogen |
| 18 | | | | Set close to typical/ expected spread | | | |
| 19 | | | | Set lower than typical spread | | | |
| 20 | Max | Avg | Set target to "not-to-exceed" temperature for quality retention. Set treatment target at around half of the typical spread below control target. Set treatment duration to achieve microreduction goal. | Set higher than typical spread | | Quality retention limit | Control target |
| 21 | | | | Set slightly less than double the control-treatment differential | | | |
| 22 | | | | Set lower than typical spread | | | |
| 23 | | | Set control tareget above treatment target, by slightly more than half of the specified spread limit | Set higher than typical spread | | Treatment target and allowed spread | Target pathogen |
| 24 | | | | Set close to typical/ expected spread | | | |
| 25 | | | | Set lower than typical spread | | | |
| 26 | Min | Max | Violates one or more principles, specific principle depending on settings | Close to typical/expected spread | | | |
| 27 | Avg | Max | Violates one or more principles, specific principle depending on settings | Lower than typical spread | | | |
| 28 | Max | Max | Set control target to "not-to-exceed" temperature for quality retention. Set treatment target slightly below control target. Setting above control target would violate convergence principle. Setting too low will violate controllability principle. | Set higher than typical spread | | Quality retention limit | Control target |
| 29 | | | | Set close to typical/ expected spread | | | |
| 30 | | | | Set lower than typical spread | | | |

FIG. 12E

1207

1216 1218 1220 1222

| Scenario No. | Driver for Spread Limit | Frequency of Meeting Treatment Target | Likelihood of Equilibration | Uncertainty: Upside |
|---|---|---|---|---|
| 17 | | Very high | Low | Low actual spread will have better quality retention and higher microbial reduction |
| 18 | | High | Normal | Low actual spread will have better quality retention and higher microbial reduction |
| 19 | | Moderate | High | Low actual spread will have better quality retention and higher microbial reduction |
| 20 | Cycle time | Moderate | Low | Low actual spread will have higher microbial reduction |
| 21 | Convergence principle | Moderate | Normal | Low actual spread will have higher microbial reduction and potentially reduced process time |
| 22 | Microbial reduction | Moderate | High | Low actual spread will have higher microbial reuction and potentially reduced process time. |
| 23 | Cycle time | High | Low | Low actual spread will have higher microbial reduction |
| 24 | | Moderate high | Normal | Low actual spread will have higher microbial reuction and potentially reduced process time |
| 25 | Microbial reduction | Moderate | High | Low actual spread will have higher microbial reduction and potentially reduced process time |
| 26 | | | | |
| 27 | | | | |
| 28 | Cycle time | Very high | Low | Low actual spread will have higher bioreduction |
| 29 | | High | Normal | Low actual spread will have higher bioreduction |
| 30 | Microbial reduction | Moderate high | High | Low actual spread will have slightly higher bioreduction |

FIG. 12F

1209

| Scenario No. | Uncertainty: Downside (1224) | Trade-off (1226) | Microbial Reduction (1228) | Quality Retention (1230) | Throughput (1232) |
|---|---|---|---|---|---|
| 17 | High actual spread will slightly reduce quality and slightly lower microbial reduction | Trade-off between cycle time and an equal share of microbial reduction and quality retention | Slightly important | Slightly important | Important |
| 18 | High actual spread will lengthen process time | | Important | Important | Slightly important |
| 19 | High actual spread will significantly lengthen process time | | Important | Important | Not important |
| 20 | High actual spread may lead to non-convergence | Trade-off between cycle time and microbial reduction | N/A | N/A | N/A |
| 21 | High actual spread will lower microbial reduction and lengthen process time | | Slightly important | Most important | Slightly important |
| 22 | High actual spread will slightly lower microbial reduction and significantly lengthen process time | | Important | Most important | Not important |
| 23 | High actual spread will lower microbial reduction | Trade-off between cycle time, microbial reduction, and quality retention | Slightly important | Not important | Important |
| 24 | High actual spread will lower microbial reduction and lengthen process time | | Slightly important | Slightly important | Slightly important |
| 25 | High actual spread will slightly lower microbial reduction and significantly lengthen process time | | Important | Important | Not important |
| 26 | | | N/A | N/A | N/A |
| 27 | | | N/A | N/A | N/A |
| 28 | High actual spread may yield lower bioreduction | Trade-off between cycle time and microbial reduction | Not important | Very important | Important |
| 29 | High actual spread may lengthen process time | | Slightly important | Very important | Slightly important |
| 30 | High actual spread will lengthen process time | | Important | Very important | Not important |

RF TREATMENT SYSTEMS AND METHODS

CROSS-REFERENCE TO RELATED APPLICATION

The present application claims priority to U.S. Provisional Application No. 63/068,852 filed on Aug. 21, 2020 and titled RF TREATMENT SYSTEMS AND METHODS, the content of which is hereby incorporated by reference for all purposes.

FIELD

The present description relates generally to radio-frequency (RF) treatment methods and systems.

BACKGROUND/SUMMARY

RF treatment has been found to be advantageous in the treatment of various products, including agricultural plant products such as cannabis. Other products that may be treated may include other food products, such as nuts, seeds, fruit, etc. In previous approaches, RF treatment systems and methods have heated products to a predetermined temperature (or within a predetermined temperature range) and held the products at such temperatures for a threshold amount of time.

However, the inventors herein have recognized potential issues with such previous systems and methods. As one example, such previous approaches may fail to take into account an actual temperature of the product while the product is being processed. Thus, the product quality may be inconsistent as the product may be overheated or under heated. Further, even if the temperature of the product is being monitored, such temperature monitoring is often inaccurate. This is not least because previous approaches for temperature monitoring have failed to take into account variation in temperature throughout the product or potential errant readings with temperature probes used to measure the product temperature.

Moreover, previous temperature profiles used for treating products may not be customized to various product characteristics and desired outcomes. In particular, previous approaches may fail to adjust run parameters in view of different product characteristics (e.g., product weight, moisture content, etc.) and desired outcomes (e.g., reduce specific microbial counts, avoid degradation of THC and terpenes, achieve a moisture content within a predetermined range).

Thus, the inventors have developed systems and methods to at least partially address the above problems. In the example methods and systems developed by the inventors, during a first treatment stage RF power may be applied at a first power level until a first target temperature is reached, wherein the first target temperature is less than a final target temperature. Then, responsive to reaching the first target temperature, the approach may include transitioning to a second treatment stage, and varying application of the RF power via feedback control in the second treatment stage until final target temperature is achieved. The run parameters of the first treatment stage and the second treatment stage may be based on selection of a recipe, based on manually input run parameters, or based on one or more product characteristics and desired treatment outcomes.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 12A, FIG. 12B, FIG. 12C, FIG. 12D, FIG. 12E, and FIG. 12F show a table of temperature control strategies, according to one or more examples of the present disclosure.

DETAILED DESCRIPTION

The following description relates to RF systems and methods for improved accuracy and efficiency in treating various products while achieving desired product qualities. In at least one example, the products being treated may include various agricultural plant products such as cannabis (where cannabis includes hemp).

Figure 1:
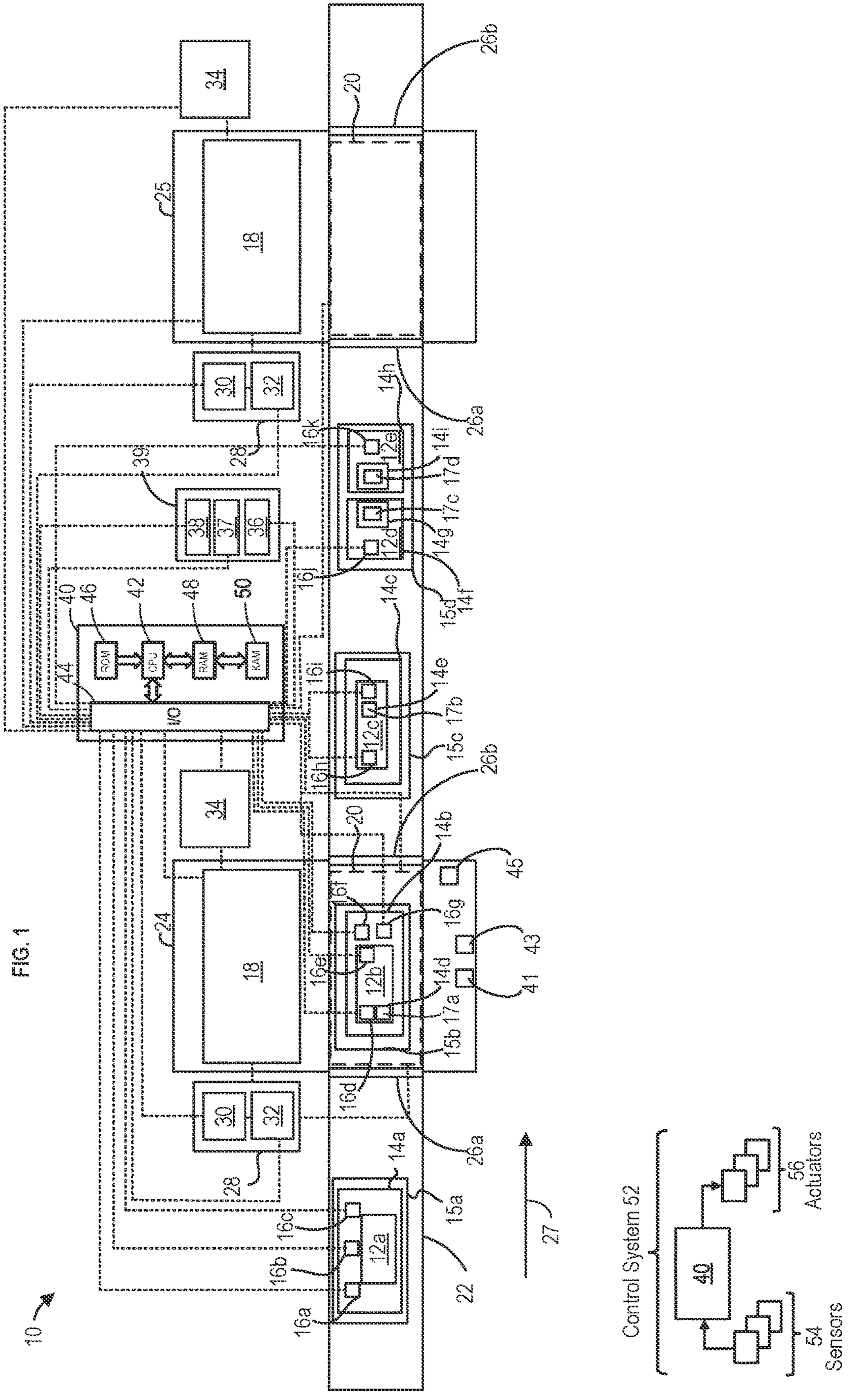
FIG. 1 shows a schematic representation of an RF system, according to one or more examples of the present disclosure.

The products may be treated via an RF system, such as the system described at FIG. 1, for example. The RF system may include a controller with instructions stored in non-transitory memory to improve accuracy and efficiency in treating various products by way of one or more methods, such as the method described at FIG. 2 and the corresponding sub-routines described at FIGS. 3-11B. Moreover, within these methods and sub-routines, there are several temperature control strategies such as those shown at FIG. 12A-FIG. 12F that may be employed for providing temperature information as part of the information used in the feedback control of the method described at FIG. 2 and corresponding sub-routines described at FIGS. 3-11B.

For purposes of discussion, the figures will be described collectively. Thus, similar components may be labeled similarly and may not be re-introduced.

FIG. 1 shows a schematic block diagram of an example RF system 10 for radiofrequency heating of a product 12*a*, 12*b*, 12*c*, 12*d*, 12*e*. In one or more examples, it is noted that product 12*a*, 12*b*, 12*c*, 12*d*, 12*e* may be a plant product. Thus, product 12*a*, 12*b*, 12*c*, 12*d*, 12*e* may also be referred to as a plant product or an agricultural plant product herein. In some examples, the plant product may be cannabis such as hemp. However, in other examples, other plant products may be possible, such as leafy vegetables or herbs, as well as food products such as nuts and fruits. It is noted that the plant product may also be referred to as agricultural plant product or product herein.

The product 12*a*, 12*b*, 12*c*, 12*d*, and 12*e* may be contained in containers 14*a*, 14*b*, 14*c*, 14*d*, 14*e*, 14*f*, 14*g*, 14*h*, 14*i*. In some examples, containers 14*a*, 14*b*, 14*c*, 14*d*, 14*e*, 14*f*, 14*g*, 14*h*, 14*i* may be bags. The inventors have recognized that control of the immediate environment of the product being RF processed to achieve several technical advantages. For example, as RF energy is absorbed by a product being processed and a temperature of the product begins to increase, moisture in the product is released into the immediate environment in the form of water vapor. Water vapor absorbs RF energy. Thus, by enveloping the product being processed in a bag (such as one of containers 14*a*, 14*b*, 14*c*, 14*d*, 14*e*, 14*f*, 14*g*, 14*h*, 14*i*), the water vapor is retained along with other volatile organic compounds e.g., terpenes, in the immediate environment of the product being treated. The inventors unexpectedly found that retaining the water vapor along with other volatile organic compounds in the immediate environment by enveloping the product being processed in the bag to achieve advantages of a more uniform absorption of RF energy and reduced moisture loss. It is noted that moisture loss is considered detrimental for many agricultural products, as moisture loss may lead to reduced revenue. For example, moisture loss may lead to a reduction in perceived and actual quality, depending on the product.

Put another way, RF treatment is a thermal process and causes moisture loss during processing. By processing in a near airtight container, moisture retention may be improved and potentially volatile material that are also evolved during RF treatment e.g. terpene which can then get reabsorbed by the cannabis during an equilibration period of typically 24-48 hours on open air racks at room temperature.

A single microclimate created by processing the product in one of the containers discussed herein allows for easy circulation of water vapor and helps maintain relatively uniform temperature distribution inside the entire bag of cannabis and a relatively tight temperature distribution (e.g., typically less than 10° C.).

Via the approach discussed herein utilizing a container, processing batch size can be scaled bigger or smaller as long as the entire batch of product is contained in the same microclimate e.g. in one bag, such as a nylon bag. Additionally or alternatively, the entire batch of product may be contained in the same microclimate by being positioned in substantially airtight containers that are thermodynamically connected e.g. in close vicinity, with easy circulation/exchange of water vapor generated during RF processing.

Each of the containers 14*a*, 14*b*, 14*c*, 14*d*, 14*e*, 14*f*, 14*g*, 14*h*, 14*i* may comprise the same or different materials that are RF safe. In at least one example, one or more of the containers may comprise nylon. The inventors have found that nylon bags exposed to a heated chamber allow for better external heat equilibration compared to other more traditional options, such as placing the product into a bin made of thick plastic. The thin nylon material allows for a more quick and efficient transfer of the heat from the chamber air into air inside the bag and the product that is near the bag material.

The product is placed in a bag (containers 14*a*, 14*b*, 14*c*, 14*d*, 14*e*, 14*f*, 14*g*, 14*h*, 14*i*) in a manner such that the product is snugly packed within the bag. Snug packing allows for a uniform temperature distribution as well as higher amount of RF energy absorption due to more favorable dielectric property per unit volume. As just one example where the product may be cannabis, snug packing may be achieved by pressing down on the bag containing the product to remove any voids, and then sealing the bag while maintaining the snug fit. In another example where the product is almonds, almonds that may be fed onto a belt, and a weighted roller or a hopper that holds a fixed height of product may apply pressure on the product as it gets deposited onto a moving belt prior to conveying the product into the RF chamber for heating. Such example approaches may advantageously achieve substantially uniform packing density.

In at least one example, the containers 14*a*, 14*b*, 14*c*, 14*d*, 14*e*, 14*f*, 14*g*, 14*h*, 14*i* may be positioned within processing trays 15*a*, 15*b*, 15*c*, and 15*d*. The processing trays 15*a*, 15*b*, 15*c*, 15*d* may be polypropylene trays comprising an RF safe material. Processing trays 15*a*, 15*b*, 15*c*, 15*d* may have a solid bottom in some examples. However, other shapes and forms for both processing trays 15*a*, 15*b*, 15*c*, 15*d* and containers 14*a*, 14*b*, 14*c*, 14*d*, 14*e*, 14*f*, 14*g*, 14*h*, 14*i* may be possible in one or more examples.

For example, one or more of the polypropylene trays 15*a*, 15*b*, 15*c*, 15*d* and containers 14*a*, 14*b*, 14*c*, 14*d*, 14*e*, 14*f*, 14*g*, 14*h*, 14*i* may have a mesh bottom in order to allow convective air to move through the container, aiding the treatment of the plant product 12*a*, 12*b*, 12*c*, 12*d*, 12*e* and subsample plant product 17*a*, 17*b*, 17*c*, 17*d* contained therein. The bottom of containers 14 may additionally or alternatively comprise perforations, in at least one example. One or more of the containers 14*a*, 14*b*, 14*c*, 14*d*, 14*e*, 14*f*, 14*g*, 14*h*, 14*i* and processing trays 15*a*, 15*b*, 15*c*, 15*d* may additionally or alternatively be sealed in order to aid in water vapor formation. Examples where one or more of the processing trays 15*a*, 15*b*, 15*c*, 15*d* and containers 14*a*, 14*b*, 14*c*, 14*d*, 14*e*, 14*f*, 14*g*, 14*h* are sealed may be advantageous for aiding the formation of steam in containers 14*a*, 14*b*, 14*c*, 14*d*, 14*e*, 14*f*, 14*g*, 14*h*, 14*i* during RF heating of the plant product 12*a*, 12*b*, 12*c*, 12*d*, 12*e* and subsample plant product 17*a*, 17*b*, 17*c*, 17*d*. The steam may be formed as RF heating causes water within the agricultural plant product 12*a*, 12*b*, 12*c*, 12*d*, 12*e* and subsample plant product 17*a*, 17*b*, 17*c*, 17*d* to increase in temperature and vaporize. This steam in processing trays 15*a*, 15*b*, 15*c*, 15*d* and containers 14*a*, 14*b*, 14*c*, 14*d*, 14*e*, 14*f*, 14*g*, 14*h*, 14*i* may aid in uniform heating of the agricultural plant product 12*a*, 12*b*, 12*c*, 12*d*, 12*e* and subsample plant product 17*a*, 17*b*, 17*c*, 17*d* as a steam micro environment may be formed within the product itself (e.g., cannabis buds, leafy vegetables, herbs, etc.) as well as within the processing trays 15*a*, 15*b*, 15*c*, 15*d* and containers 14*a*, 14*b*, 14*c*, 14*d*, 14*e*, 14*f*, 14*g*, 14*h*, 14*i*.

Of further benefit, this steam may be formed without adding any moisture from a foreign source and without increasing the product moisture content. Thus, as the plant product 12*a*, 12*b*, 12*c*. 12*d*, 12*e* and subsample plant product 17*a*, 17*b*, 17*c*, 17*d* is being heated, a temperature of the product may be more accurately monitored, ensuring that all of the plant product 12*a*, 12*b*, 12*c*, 12*d*, 12*e* and subsample plant product 17*a*, 17*b*, 17*c*, 17*d* reaches a threshold temperature. In some examples, this threshold temperature may be a kill temperature for particular microbes such as yeast or mold.

The temperature of the plant product 12*a*, 12*b*, 12*c*, 12*d*, 12*e* and subsample plant product 17*a*, 17*b*, 17*c*, 17*d* within containers 14*a*, 14*b*, 14*c*, 14*d*, 14*e*, 14*f*, 14*g*, 14*h*, 14*i* may be detected via one or more temperature probes 16, such as one or more of temperature probes 16*a*, 16*b*, 16*c*, 16*d*, 16*e*, 16*f*, 16*g*, 16*h*, 16*i*, 16*j*, 16*k* shown in FIG. 1. The one or more temperature probes 16 may be fiber optic probes that measure the temperature of the product throughout the RF heating process. In particular, the one or more temperature probes 16 may be fiber optic probes with a temperature sensitive crystal at their tips. In addition to the one or more temperature probes 16, in some examples, sensors may include sensors suitable for the RF environment. However, other types of temperature probes may be possible.

In the case of cannabis, as one example, one of the temperature probes 16 may be placed within an average sized bud in order to estimate a temperature of all of the product within container. A measuring tip of the temperature probe 16 may be positioned so that it penetrates the densest part of the bud in order to ensure more accurate monitoring. In examples where other leafy vegetables or herbs may be undergoing the RF heating process, however, a temperature probe of the one or more temperature probes 16 may be placed within an average sized unit of such leafy vegetable, herbs, fruit, etc.

In at least one example, the processing trays 15 may include one or more holes at specific locations for receiving the one or more temperature probes. These one or more holes may be formed into a lid of the processing trays 15, in examples where the processing trays include lids. Such one or more holes may additionally or alternatively be formed into one or more walls of the processing trays 15. The inventors have found that such holes in the trays 15 (also referred to herein as perforations) allow the flow of heated chamber air to impinge directly on the containers 14 (e.g., bags such as nylon bags) within the processing trays 15. One or more of the processing trays 15 may include perforations on the bottom and all four sides to allow the flow of heated chamber air onto a bag contained therein, in at least one example. This helps achieve the following: The container 14 (a bag such as a nylon bag) and the air inside the container gets hot, typically above a dew point inside the bag that the product material (e.g., cannabis) closest to the bag material experiences the heat environment that created within the RF chamber, and reduces the temperature gradient. Thus, a heat loss is reduced between the product (e.g., cannabis) and the RF chamber environment.

In at least one example, each processing tray may include one or more holes at approximately the same locations to assist in consistent placement of the temperature probes 16. Additionally or alternatively, the temperature probes 16 may include a marking to help indicate a depth that the probe is to be inserted into the tray at the holes. Such markings also help to ensure consistent placement of the probes.

In addition to the perforations, the processing trays 15 may be designed with the bottom elevated slightly, in at least one example. For example, the bottom of the processing trays 15 may be raised by 1 cm to 4 cm (for a typical electrode height between 200 cm to 300 cm in the current design). This elevation of the product affects the product's position relative to the top and bottom electrodes during processing and has been found to achieve technical advantages of a more uniform temperature distribution within the product. The particular positioning of the product to achieve improved heating uniformity varies depending on the product. For cannabis, the inventors have found that elevating the product above the bottom electrode achieves improved uniformity of temperature distribution compared to other positions. Holding the bag at an elevated position above the bottom electrode allows for a more homogeneous RF field distribution and thereby a more uniform RF treatment. Moreover, an elevated location above the bottom electrode when coupled with product placement (e.g., a bag containing product such as cannabis) on a tray that has holes on one or more of the side walls and/or bottom for air exchange allows sweeping of the bag with recirculating hot air to achieve benefits of improved uniformity of the product during heating, avoiding loss of heat from the product during a temperature-hold period, as well as avoiding undesirable condensation on the container. Each of the temperature probes 16 may output a signal to controller 40, and these signals may be processed at controller 40 to calculate a temperature of the product within the container. It is noted that communicative connections are represented in dash line in FIG. 1. Thus, the signaling from the temperature probes 16 to the controller 40 is represented by the lines in dash at FIG. 1. In some examples, a plurality of temperature probes 16 may be used in order to more accurately estimate a temperature of the product within the container 14. In examples where a plurality of temperature probes 16 may be used, these multiple temperature probes 16 may be positioned within the product (e.g., multiple cannabis buds, leafy vegetables, herbs, nuts, fruits, etc.) and throughout the associated container(s) within which the product is held in order to detect a temperature at multiple horizontal and vertical positions.

As shown in FIG. 1, containers 14*b* and 14*d* containing plant product 12*b*, as well as temperature probes 16*d*, 16*e*, 16*f*, 16*g*, may be positioned between a first electrode assembly 18 and a second electrode assembly 20. In at least one example, the first electrode assembly 18 and the second electrode assembly may be positioned vertically above and below the agricultural plant product. It is noted that the second electrode assembly 20 is shown in dash, as second electrode assembly is positioned below the processing tray 15*b* and the platform on top of which the processing tray 15*b* rests. In at least one example, the second electrode assembly 20 may be integrated into the platform on top of which the processing tray 15*b* rests. The processing trays may further rest on a conveyor belt between the first electrode assembly 18 and the second electrode assembly 20, in at least one example.

It is noted that subsample plant product 17*a* is positioned within a container 14*d*. Container 14*d* is further positioned within another container 14*b*, where container 14*b* contains plant product 12*b*. In examples herein where there is subsample plant product embedded within plant product, it is noted that the subsample plant product is the same type of plant product as the plant product within which it is embedded. This is because the subsample plant product is to be used for downstream analysis as a representative sample for plant product within which it is embedded.

For example, the subsample plant product 17*a* is the same type of plant product as plant product 12*b*. It is noted that container 14*d* may also be referred to herein as a subsample container. Further, in at least one example, subsample plant product 17*a* may be ground while the plant product 12*b* may be unground.

Similarly to subsample plant product 17*a*, subsample plant product 17*b* is positioned within container 14*e*. Container 14*e* is positioned within another container 14*c*, where container 14*c* contains agricultural plant product 12*c*. Container 14*e* may also be referred to herein as a subsample container. In at least one example, the subsample containers 14*d*, 14*e* may be pouches. That is, subsample containers 14*d*, 14*e* may be bags. Plant product 17*a*, 17*b* may be positioned within subsample containers such as subsample containers 14*d*, 14*e* in cases where the subsample plant product is a ground sample, for example. The plant product in which the subsample containers are embedded (plant product 12*b*, 12*c*) may be unground. The subsample containers 14*d*, 14*e* and containers 14*b*, 14*c* comprise RF safe materials.

It is noted that the subsample containers may be embedded within the product held within the container. The subsample containers may be placed in a location within the product that is predicted to provide a desirable representative reading for RF process monitoring. In some examples, the subsample container may be placed in a location predicted to have a low or minimum temperature relative to the rest of the product. In other examples, the subsample container may be placed in a location in the product that is predicted to have an average temperature of the overall product during RF processing. In one or more examples, the subsample container may be placed in a location in the product that is predicted to have a high or maximum temperature relative to the rest of the product. The predicted temperature variations may be based on historical data for temperature variation during RF processing, in at least one example. For example, the historical temperature variation data may be based on previous RF processing runs for a same or similar type of product that is going to be processed.

In a case where cannabis is the product, for example, a subsample container (e.g., subsample container 14*e*) holding cannabis (e.g., ground cannabis) may be embedded within cannabis (e.g., unground cannabis) that is held in another container. A subsample container may be a nylon pouch containing cannabis, for example, and this subsample container may be embedded within a larger bag that also contains cannabis.

In examples where subsample containers are used, it is noted that a temperature probe may be positioned less than a threshold distance away from the subsample container. The threshold distance may be a distance determined close enough to the subsample to accurately monitor the temperature of the subsample being processed. For example, the threshold distance may be approximately 0.5 cm away from the subsample container. In this way, the subsample product may be representative of the remaining product that was processed.

Continuing, in addition to the above examples, in at least one example a single processing tray may hold multiple containers and subsample containers. For example, looking at processing tray 15*d*, processing tray 15*d* holds containers 14*f* and 14*h*. Each of containers 14*f* and 14*h* includes product 12*d*, 12*e* positioned therein, respectively. Embedded within each of plant product 12*d*, 12*e* are subsample containers 14*g* and 14*i*, respectively. A positioning of each of these subsample containers may be based on the reasons provided above. Subsample container 14*g* holds subsample plant product 17*c* and subsample container 14*i* holds subsample plant product 17*d*. It is noted that subsample plant product 17*c* and subsample plant product 17*d* may be ground samples while the plant product 12*d*, 12*e* may be unground product. Further embedded within each of plant product 12*d* and 12*e* is a temperature probe 16*j*, 16*k* respectively. Temperature probe 16*j* is positioned within a threshold distance of subsample container 14*g* and temperature probe 16*k* is positioned within a threshold distance of subsample container 14*i*. The threshold distance may be selected in a similar manner as discussed above.

In at least one example, the container 14*b* may be positioned between a first electrode assembly 18 and a second electrode assembly 20 on a conveyer belt 22. For example, container 14*b* may be moved from a position upstream of the first electrode assembly 18 and the second electrode assembly 20 in a downstream direction 27, such as where container 14*a* is positioned in FIG. 1, to instead be positioned between the first electrode assembly 18 and the second electrode assembly 20. It is noted that the conveyor 22 may also be actuated to move in an upstream direction, which is opposite of downstream direction 27. Examples where the RF heating system includes such a conveyer belt 22 may be advantageous to assist in moving the processing trays 15*a*, 15*b*, 15*c*, 15*d* holding containers 14*a*, 14*b*, 14*c*, 14*d*, 14*e*, 14*f*, 14*g*, 14*h*, 14*i* that contain the agricultural plant product 12*a*, 12*b*, 12*c*, 12*d*, 12*e* to a position between the first electrode assembly 18 and the second electrode assembly 20 to be RF heated. It is noted that in at least one example, multiple containers 14 may be positioned within one tray 15.

In other examples, however, there may simply be a surface (e.g., platform, table) to manually position the processing trays 15*a*, 15*b*, 15*c*, 15*d* holding containers 14*a*, 14*b*, 14*c*, 14*d*, 14*e*, 14*f*, 14*g*, 14*h*, 14*i* and the agricultural plant product 12*a*, 12*b*, 12*c*, 12*d* contained respectively therein between the first electrode assembly 18 and the second electrode assembly 20. In such examples, the processing trays 15*a*, 15*b*, 15*c*, 15*d* may be processed one at a time. The processing tray 15 itself may further act as the surface positioning the containers 14 between the first electrode assembly 18 and the second electrode assembly 20. For example, as previously discussed, one or more of the processing trays 15 may have a raised bottom surface to elevate a container 14 positioned therein.

In at least one example the first electrode assembly 18 and the second electrode assembly 20 may be contained within an RF circuit enclosure 24 (also referred to herein as an RF chamber) to aid in directing the RF heating to the agricultural plant product contained within a container 14 (such as containers 14*a*, 14*b*, 14*c*, 14*d*, 14*e*, 14*f*, 14*g*, 14*h*, 14*i*) between the first electrode assembly 18 and the second electrode assembly 20. Such an RF circuit enclosure 24 may comprise at least one door to enable insertion and removal of agricultural plant product from between the first electrode assembly 18 and the second electrode assembly 20. For example, in a case where the RF heating system may only enable batch processing of agricultural plant product, the RF circuit enclosure may include a single door to enable manual insertion and removal of agricultural plant product between the electrode assemblies.

In a case where the RF heating system enables continuous processing of agricultural plant product, the RF heating system may comprise a conveyor belt 22 that extends both upstream and downstream of the first electrode assembly 18 and the second electrode assembly 20 and the conveyor belt 22 passes between the first electrode assembly 18 and the second electrode assembly 20. Thus, to accommodate the conveyor belt 22, RF circuit enclosure 24 may include a door 26*a* at an upstream end of the RF circuit enclosure 24 and door 26*b* at a downstream end of the RF circuit enclosure 24. In other examples, it may be desirable for the conveyor belt 22 to move in an uninterrupted manner. For example, when agricultural plant products are conveyed via conveyor belt 22, the RF circuit enclosure 24 may include RF suppression tunnel at an upstream end of the RF circuit enclosure 24 and a RF suppression tunnel at a downstream end of the RF circuit enclosure 24. The RF suppression tunnels allow the infeed and outfeed to move freely, while decreasing RF leakage. Such RF suppression tunnels may be used alone or in conjunction with one or more doors. When agricultural plant product is conveyed via conveyor belt 22 to position the agricultural plant product between the two electrode assemblies of the RF circuit, both doors 26*a* and 26*b* may be in an open position. Once the agricultural plant product to be processed is positioned between the two electrode assemblies, both doors 26*a* and 26*b* of the RF circuit enclosure 24 may be closed prior to closing the RF circuit for heating the agricultural plant product. Then, following the heating of the agricultural plant product, both the upstream and the downstream doors 26*a* and 26*b* may once again be opened so that the agricultural plant product that was just heated may be conveyed downstream of the RF circuit and so that any agricultural plant product positioned on the conveyor belt 22 upstream of the first electrode assembly 18 and the second electrode assembly 20 may be conveyed to a position in between the first electrode assembly 18 and the second electrode assembly 20 for subsequent RF heating.

In at least one example, RF system 10 may include one or both of a heating element 41 and an air flow element 43. The heating element 41 and the air flow element 43 may be actuators 56 of the control system 52 that are controlled via controller 40. For example, the heating element 41 may be an electric heating element comprising a resistor, such as a coil. The air flow element 43 may be a fan in at least one example.

RF power is absorbed by product containing moisture and not via the surroundings. This being the case, product loses heat during a temperature-hold period, which leads to issues such as preventing uniform temperature distribution and issues of being able to maintain a target temperature during a temperature-hold period. Thus, temperature control is performed using closed loop air recirculation carried out via the air flow element 43 and an automatic temperature control mechanism carried out via the temperature element 41 in conjunction with the controller 40 of the control system 52. Initially, air heated by heating element 41 may be recirculated via the air flow element 43 until the RF chamber reaches a threshold temperature (e.g., ±5° C. within a target treatment temperature), so that the RF chamber is close to the treatment temperature. The threshold temperature may be based on an output of a temperature sensor 45 positioned sufficiently downstream of the heating element 41 within the RF chamber so that the temperature measured is representative of heated air that has already undergone mixing within the RF chamber. That is, via such positioning of the temperature sensor 45, the temperature output by the temperature sensor 45 more accurately represents the impact the heating element 41 is having on the RF chamber temperature than a temperature sensor arranged close to the heating element 41. The air may then continue to be heated and recirculated at the same threshold air temperature or an alternative elevated temperature during RF processing. It is noted that the air may be heated and recirculated together. This creates an RF processing environment which avoids heat loss and increased temperature spread of the product during RF processing. A further secondary benefit is that this heated recirculating air maintains the container (e.g., a bag such as a nylon bag material) above a dew point inside the container, thus reducing steam condensation which in turn reduces a loss of valuable thermal energy. In addition to preventing heat loss—preventing condensation also allows more homogeneous moisture recondensation and reabsorption during the equilibration period. In an additional example, when agricultural plant product is conveyed via conveyor belt 22 to position the agricultural plant product between the two electrode assemblies of the RF circuit, the agricultural plant product may be conveyed through RF suppression tunnels instead of doors 26*a* and 26*b*. In further examples, the RF suppression tunnels may be used in conjunction with either or both doors 26*a* and 26*b*.

It is noted that in at least one example, an RF heating system configured to perform continuous processing may additionally or alternatively be configured to perform batch processing of agricultural plant product. For example, though the RF heating system for performing continuous processing of the agricultural plant product may include some sort of conveyor to move the agricultural plant product relative to the two electrode assemblies of the RF circuit, such an RF heating system may also be used to perform batch processing of agricultural plant product. Batch processing of agricultural plant product may be carried out via the RF heating system configured to perform continuous processing by opening at least one of the doors 26*a*, 26*b*, positioning agricultural plant product between the first electrode assembly 18 and second electrode assembly 20 of the RF circuit, ensuring that both doors 26*a*, 26*b* are closed, and then closing the RF circuit. Then after the agricultural plant product has been heated to a first threshold temperature in greater than a threshold amount of time, the RF circuit may be opened, then at least one of the doors 26*a*, 26*b* may be opened, and the agricultural plant product may be manually removed from between the two electrode assemblies of the RF circuit. In some examples, RF suppression tunnels may replace or be used in conjunction with either or both doors 26*a* and 26*b*.

There further may be a second RF circuit enclosure 25 in one or more examples. It is noted that the components of second RF circuit enclosure 25 are labelled similarly as RF circuit enclosure 24 for ease of discussion. It is noted that discussion directed to components of RF circuit enclosure 24 also applies to the second RF circuit enclosure 25. The second RF circuit enclosure 25 may be positioned downstream of RF circuit enclosure 24. The RF circuit enclosure 24 and the second RF circuit enclosure may be connected via conveyor belt 22. The conveyor belt 22 may further run through second RF circuit enclosure 25. By including two RF enclosures, the first RF enclosure may carry out a first part of a treatment for a product, and the second RF circuit enclosure 25 may carry out a second part of the treatment for the product. For example, the first part of the treatment may include heating up the product to a threshold temperature and the second part of the treatment may include holding the product within a predetermined range of the threshold temperature for a target treatment time. In at least one example, the first RF circuit enclosure 24 may carry out the first stage (steps 702-706 of method 701) and the second RF circuit enclosure 25 may carry out the second stage (steps 710 to the end of method 701), where the product is conveyed (e.g., via a conveyor 22) from the first RF circuit enclosure 24 to the second RF circuit enclosure 25 at step 710. Other examples for splitting the RF processing between the two RF circuit enclosures is further possible.

Further, in at least one example, one or more of the first electrode assembly 18, the second electrode assembly 20, and the conveyor belt or surface may be adjustable. Such adjustability may be advantageous to help control an intensity with which agricultural plant product positioned between the electrode assemblies are heated. For example, one or more of the first electrode assembly 18, second electrode assembly 20, and conveyor belt 22 may be adjusted prior to heating agricultural plant product via the RF circuit to ensure that the agricultural plant product is positioned relative to the electrode assemblies to heat the agricultural plant product to a threshold temperature in greater than a threshold amount of time.

A distance between the first electrode assembly 18 and the second electrode assembly 20 may be adjusted via motor 34, in at least one example. The distance between the first electrode assembly 18 and the second electrode assembly may also be referred to herein as a height of the electrode assembly herein. The distance between the first electrode assembly 18 and the second electrode assembly 20 may be adjusted by moving both the first electrode assembly 18 and the second electrode assembly 20 towards one another via motor 34, in one or more examples. However, in at least one example only one of the first electrode assembly 18 and the second electrode assembly 20 may be moved via motor 34 to adjust the height of the electrode assembly. For example, only the first electrode assembly 18 may be moved via motor 34 to adjust the height of first electrode assembly 18. It is noted that the first electrode assembly 18 may be vertically above the second electrode assembly 20, and thus the first electrode assembly 18 may also be referred to herein as a top electrode. Processes for adjusting the distance between the first electrode assembly 18 and the second electrode assembly 20 are discussed in further detail herein.

Alternatively, in other examples, the first electrode assembly 18 and the second electrode assembly 20 may only be manually movable.

The first electrode assembly 18 and the second electrode assembly 20 are both connected to RF generator 28. The RF generator 28, the first electrode assembly 18, and the second electrode assembly 20 all form an RF circuit. When the RF circuit is closed, the RF generator 28 may create an alternating electric field between the first electrode assembly 18 and the second electrode assembly 20, where the agricultural plant product located in container 14 is positioned. This alternating electric field between the first electrode assembly 18 and the second electrode assembly 20 causes polar molecules (e.g., $H_2O$) within the agricultural plant product to reorient rapidly due to the alternating electric field, and this rapid reorientation causes heating of the agricultural plant product due to rapid oscillation of the polar molecules and ions of the product as they move rapidly past one another. Thus RF heating causes heating of the agricultural plant product from within the product.

In at least one example, the RF generator 28 may include a variable capacitor 30 and a variable frequency drive (VFD) 32, wherein the VFD is a motor to the variable capacitor mechanism 30 for regulating the RF power generated by RF generator 28. The variable capacitor 30 may include a metal plate, where a position of the metal plate is able to be adjusted via the VFD 32. In examples where a VFD 32 is included, speed of the VFD 32 motor may further be adjusted to help move the metal plate. The VFD 32 may advantageously enable a finer control compared to approaches that may use an on-off motor alone due at least in part to the VFD 32 enabling more accurate control of the variable capacitor. In other examples, the RF generator 28 may use a positioning motor instead of a VFD.

When the RF circuit is open, the RF generator 28 is unable to cause an alternating electric field between the first electrode assembly 18 and the second electrode assembly 20. Thus, when the RF circuit is open, RF heating does not occur. When the RF circuit is closed, the RF generator 28 is able to cause an alternating electric field between the first electrode assembly 18 and the second electrode assembly 20. Thus, when the RF circuit is closed RF heating does occur.

RF system 10 may be controlled at least partially by controller 40 and by input received from user input sensors 36. Controller 40 may be a microcomputer, including a microprocessor 42, input/output ports 44, an electronic storage medium for executable programs and calibration values shown as a read only memory 46 in this particular example, random access memory 48, keep alive memory 50, and a data bus. Storage medium read-only memory 46 can be programmed with computer readable data representing instructions executable by microprocessor 42 for performing the methods and routines described herein as well as other variants that are anticipated but not specifically listed.

Controller 40 may be a part of control system 52 for RF system 10, where control system 52 includes sensors 54, controller 40, and actuators 56. Controller 40 may receive various signals from sensors 54 and then control one or more actuators 56 responsive to the signals received. Such sensors 54 may include at least one of user input sensors 36 and temperature probes 16. The temperature probes may also be referred to as temperature sensors herein. User input sensors 36 may include one or more of capacitive touch sensors, buttons, and microphones for receiving voice commands, a mouse, keyboard, and a touch screen, for example. Other sensors that are capable of receiving a user input may also be possible. The user input sensors 36 may be part of a human machine interface (HMI) 39, where the HMI 39 may further include one or more of a display 37 and a sound generator 38.

Sensors 54 may additionally or alternatively include sensors integrated into one or more of first electrode assembly 18, second electrode assembly 20, motor 34, conveyor 22, and RF generator 28 (including variable capacitor 30 and VFD 32), in at least one example. Sensors 54 may further include environmental sensors, such as moisture sensors and oxygen sensors, for example. Such environmental sensors may be included in one or more of containers 14 in similar positions as temperature probes 16, for example.

Additionally or alternatively, a single temperature sensor (e.g., a fiber optic temperature sensor) may be used, and this single temperature sensor may be able to measure the temperature at multiple temperature locations. The single temperature sensor may be positioned below the product being processed in at least one example. For example, the single temperature sensor may be placed under the product inside one of the containers or on the conveyor belt. Via this approach, one temperature sensor may be used to measure the temperature of the product in several locations simultaneously. In at least one example, a Bragg sensor may be the single temperature sensor used to detect the temperature of the product. The Bragg sensor may be a fiber Bragg grating sensor comprising a fiber that has been precision etched in a particular pattern that causes laser light at specific frequencies to be reflected back to the source. Expansion of the fiber causes a shift in the frequency of the reflected light, allowing temperature local to the etched portion of the fiber to be detected. Etching of different patterns at different positions along the fiber (corresponding to different reflection frequencies) allows the detection of temperatures at different locations along the same fiber optic. Thus, instead of merely being inserted at a specific location, the Bragg sensor may be strung along a particular path, allowing multiple locations to be measured. The Bragg sensor may comprise optical multiplexers, in at least one example. Further, in at least one example, a mat of such Bragg sensors may be positioned underneath the product, thus measuring the bottom surface temperature during a treatment process, including treatment processes where a conveyor is used.

Further, in at least one example, the sensors may include a camera. This camera may be an IR camera. The IR camera may output thermal imaging, also referred to as IR thermography, data to the controller 40 for analysis. Such thermal imaging may be indicative of a surface temperature of product being processed in the RF chamber. Then, based on the surface temperature thermal imaging, an overall temperature of the product (including the internal temperature and temperature variation throughout the product) may be estimated.

Actuators 56 may include one or more of motor 34, a motor for driving conveyor 22, display 37, sound generator 38, and RF generator 28 (including variable capacitor 30 and VFD 32), for example.

Figure 2:
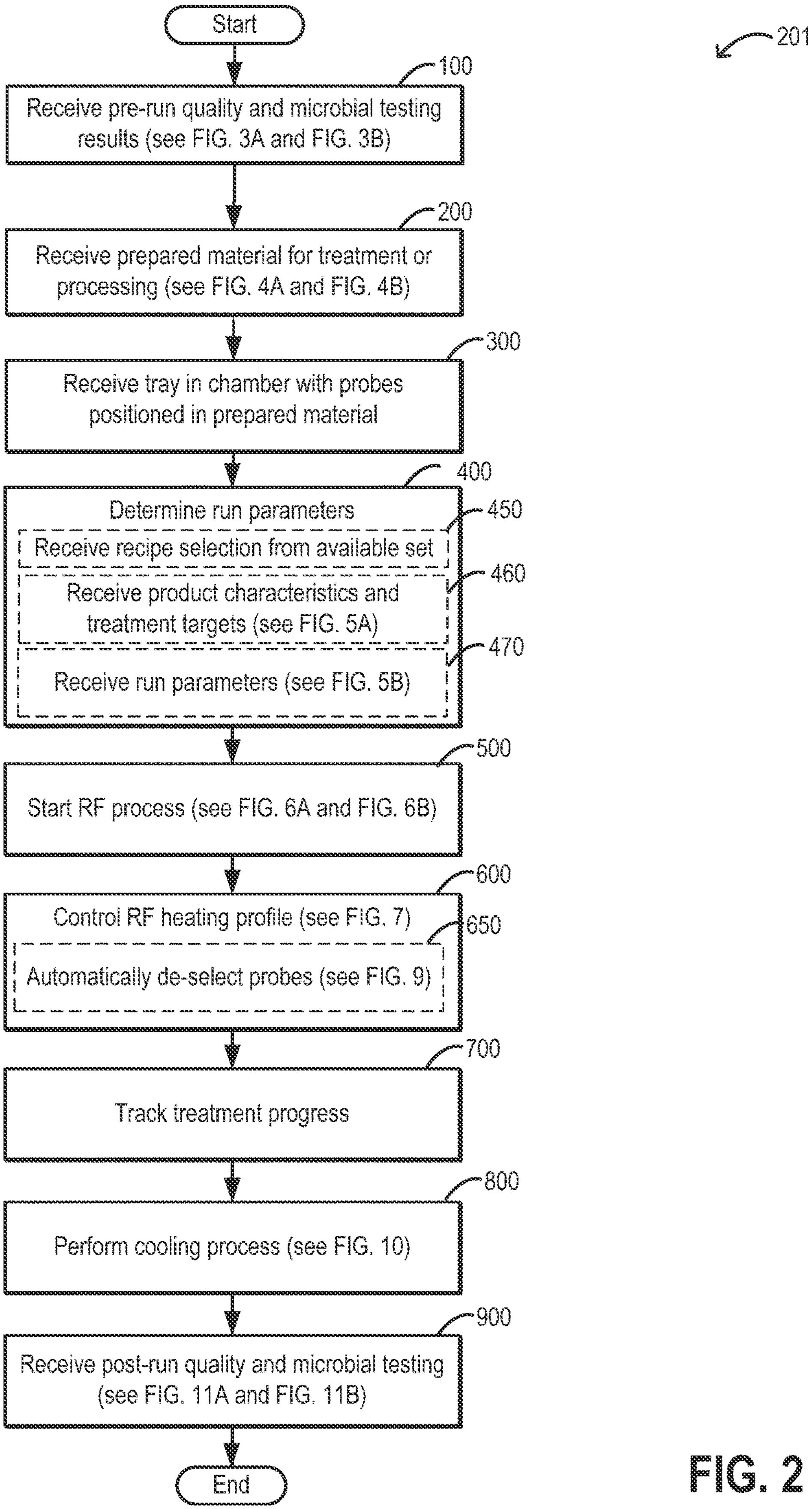
FIG. 2 shows a flow chart of a first method, according to one or more examples of the present disclosure.

Turning now to FIG. 2, FIG. 2 shows a flow chart for an example method 201. Instructions for carrying out method 201 and the rest of the methods included herein may be executed by a controller (e.g., controller 40) based on instructions stored on a memory of the controller and in conjunction with signals received from sensors of the RF system, such as the sensors described above with reference to FIG. 1. The controller may employ actuators of the RF system to adjust operation, according to the methods described below.

Method 201 is a high level method for performing RF treatments in a manner which advantageously achieves a desired level of microbial reduction while maintaining product quality. In at least one example, the product being processed may be any one of the agricultural plant products discussed herein. For example, the agricultural plant products may include cannabis, including hemp.

Figure 3A:
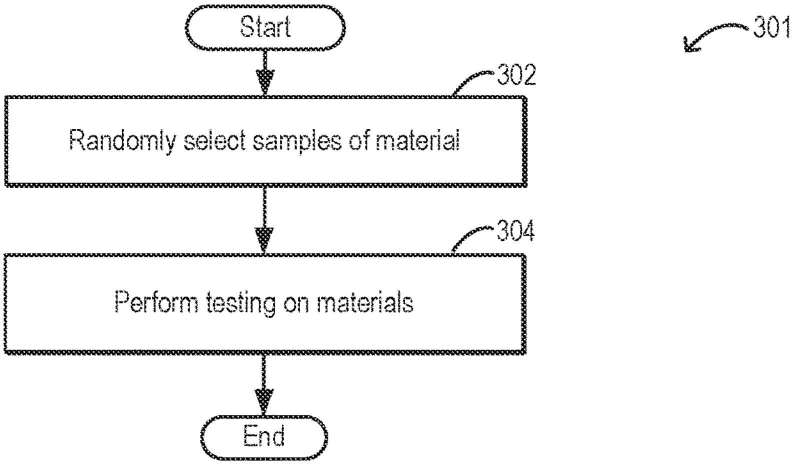
FIG. 3A shows a flow chart of a second method, according to one or more examples of the present disclosure.
Figure 3B:
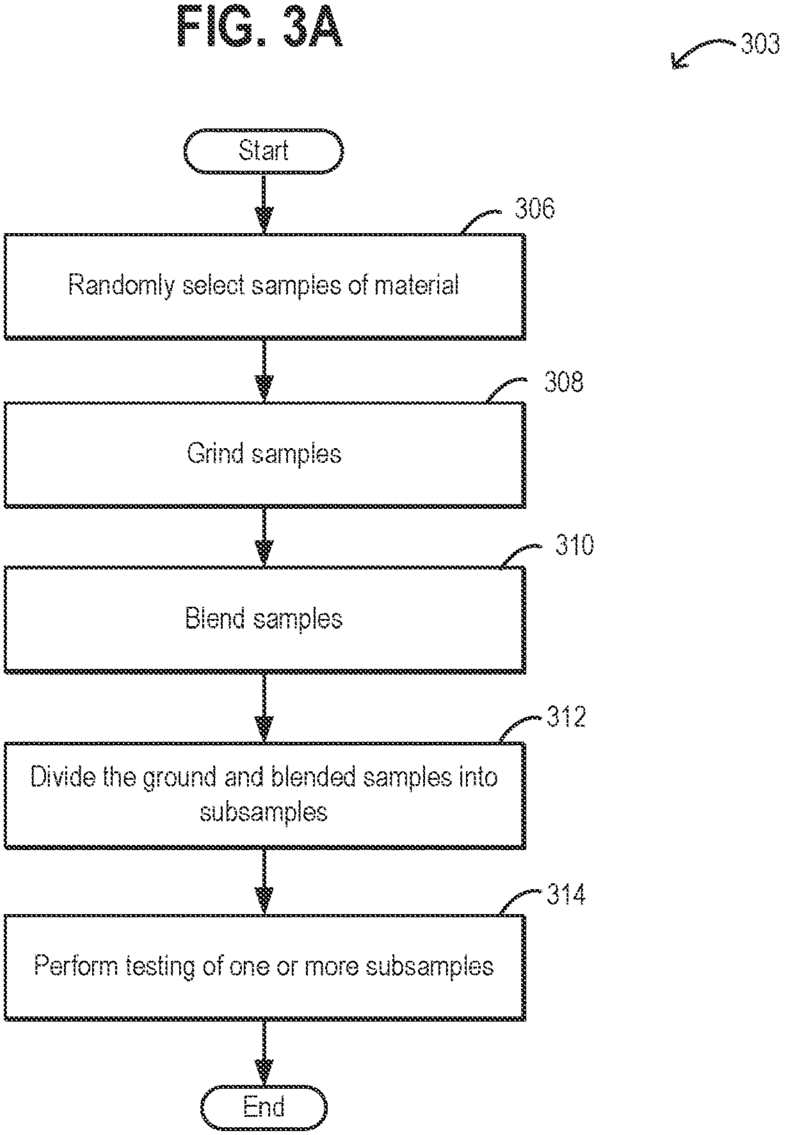
FIG. 3B shows a flow chart of a third method, according to one or more examples of the present disclosure.

Turning first to step 100, step 100 of method 201 includes receiving pre-run quality and microbial testing results. Looking briefly to FIG. 3A and FIG. 3B, FIG. 3A and FIG. 3B show example pre-run quality and microbial processing methods that may be included at step 100 of method 201. In at least one example, pre-run quality and microbial testing results from product used in other runs may be substituted, if such results are deemed to be similar across the same batch or lot of product. In at least one example, pre-run quality and microbial testing results may be estimated based on prior experience.

A first pre-run quality and microbial processing method 301 is shown at FIG. 3A. Method 301 includes randomly selecting samples of material at step 302. The material in this case refers to the agricultural plant product being processed. For example, the random samples may be random samples of the cannabis being processed in method 201. Method 301 further includes performing testing on the materials randomly sampled at step 304. In particular, prior to applying RF treatment, samples of the agricultural plant product (e.g., cannabis/hemp) may undergo lab testing for microbial counts, such as total yeasts and molds count (TYMC), total aerobic microbial count (TAMC), coliforms, *E. coli, Aspergillus*, and *Salmonella*. Samples may additionally or alternatively be analyzed for quality assessments, such as THC, THCA, terpenes and moisture content.

The results of the lab testing at FIG. 3A (also referred to herein as the pre-run quality and microbial testing results) may be output to a controller (e.g., controller 40) carrying out the RF processing of method 201. For example, the results may be received at the controller via a user input to one or more of the user input sensors. Additionally or alternatively, the results may be electronically sent to the controller from a computing device. That is, a computing device that carried out the lab testing and/or a computing device that has the lab results stored thereon may send the results electronically to the controller. The results of the lab testing may additionally or alternatively be output to a user computing device or a remote computing device of the RF system, in one or more examples.

In at least one example, the pre-run quality and microbial processing may include method 303 shown at FIG. 3B. At step 306 of method 303, samples of material are randomly sampled. As with method 301, the material at method 303 refers to the agricultural plant product being processed in method 201. For example, the random samples at method 303 may be random samples of the cannabis being processed in method 201. For accurate determination of before and after differences, a special homogenization process may be undertaken for samples collected for microbial testing.

After step 306, method 303 may include grinding the samples selected at step 308 in a grinder. For example, the samples selected at step 306 may be ground in a cannabis grinder (or any suitable grinder) at step 308. Following step 308, the ground samples may be blended at step 310. For example, the ground samples may be manually blended at step 310. By using ground samples for testing, it is noted that improved accuracy as to log kill test results may result. However, ground samples are not to be used for moisture content and terpene testing. This is not least because the grinding releases moisture and terpenes, which would lead to inaccurate moisture and terpene lab results. Following step 310, the samples that were ground at step 308 and blended at step 310 are divided into subsamples at step 312. The subsamples may include a first subsample to be used for performing the pre-run quality and microbial testing at step 100, a second subsample to be used at step 900 of method 201, and a third subsample to be retained in reserve, for additional testing, if needed. Additional subsamples may further be produced if needed for placement in multiple locations within the material to be treated.

Following step 312, method 303 includes performing testing on the one or more subsamples at step 314. For example, any one or combination of the lab tests discussed at step 304 at FIG. 3A may be carried out at step 314. That is, any one or more of lab testing for microbial counts, such as total yeasts and molds count (TYMC), total aerobic microbial count (TAMC), coliforms, *E. coli, Aspergillus*, and *Salmonella* may be carried out. The one or more subsamples may additionally or alternatively be analyzed for quality assessments, such as THCA, for example.

Similarly to method 301, method 303 may include sending the results of the lab testing to the controller carrying out the RF processing for method 201. Any one or combination for sending the lab results to the controller as discussed above may be used to send the lab results at step 314 of method 303.

Looking back now to FIG. 2, after receiving the pre-run quality and microbial testing results at step 100, method 201 includes receiving prepared material for treatment or processing at step 200. For example, receiving the prepared material may include receiving material prepared for treatment or processing on a conveyor (e.g., conveyor 22) of the RF system. Additionally or alternatively, receiving the prepared material for treatment or processing at step 200 may include receiving the prepared material within an RF chamber for treatment or processing at step 200. It is noted that the RF chamber is a position in an RF system (e.g., RF system 10) where the RF treatment is received. For example, at FIG. 1, the RF chamber may be in the enclosure 24 between the first electrode assembly 18 and the second electrode assembly 20.

Figure 4A:
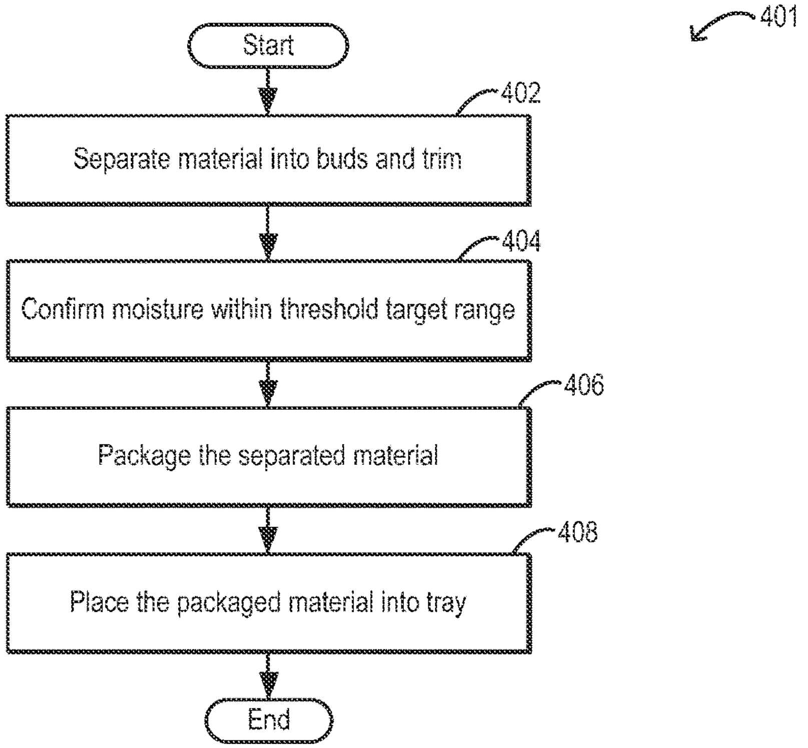
FIG. 4A shows a flow chart of a fourth method, according to one or more examples of the present disclosure.
Figure 4B:
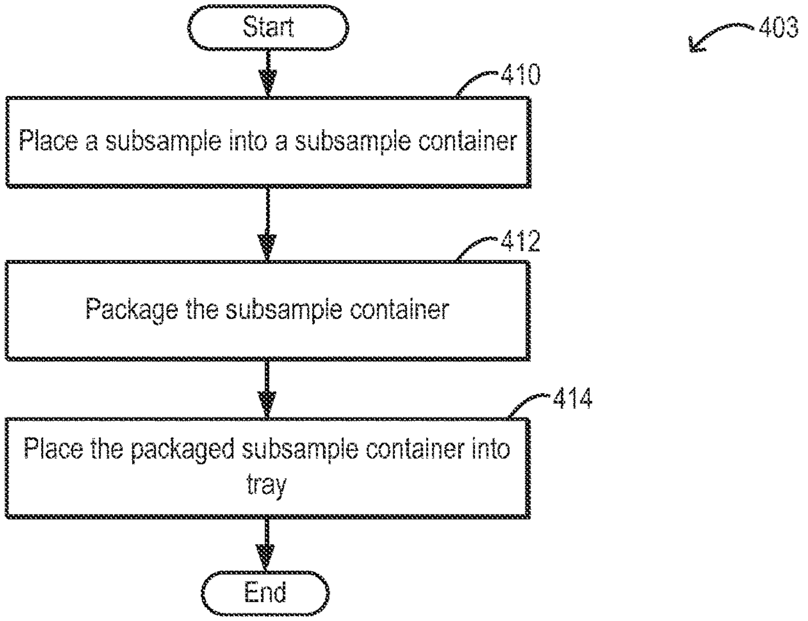
FIG. 4B shows a flow chart of a fifth method, according to one or more examples of the present disclosure.

Looking briefly to FIG. 4A and FIG. 4B, example methods 401 and 403 are shown for preparing the material for treatment or processing at step 200. There are several factors that affect the absorption of RF power of materials, including agricultural plant products such as cannabis. Accordingly, the material may be prepared properly to ensure desired processing outcomes. Such preparation may include separating the material by size and shape uniformity. For example, in a case where the material is cannabis, cannabis buds and trim should not be treated in the same lot. Further, in at least one example, buds may be separated by size to be treated together in the same lot. However, it is also acceptable for buds of varying size to be treated in the same lot in one or more examples.

Looking to FIG. 4A, method 401 at FIG. 4A includes separating the material into buds and trim at step 402. After separating the material at step 402, step 404 of method 401 includes confirming that the moisture of the material is within a threshold target range. Moisture, similar to size, is another factor that may affect the absorption of RF power of materials.

In at least one example, a suitable moisture for RF processing may be between 6% and 15% by weight. A moisture range that is from 10% to 12% by weight may be particularly suitable, especially in the case of cannabis processing. Thus, the threshold target range for the moisture at step 404 may be between approximately 6% and 15% by weight. Or, the threshold target range for the moisture at step 404 may be a moisture range that is from 10% to 12% by weight. Other threshold target ranges are also possible, adjusted for the particular agricultural plant product being processed.

To ensure uniform moisture distribution when confirming whether the moisture is within the target threshold range at step 404, the material may be cured as part of the confirmation process at step 404. For example, in a case where the material may be cannabis, the cannabis may be cured in large containers for at least two days at room temperature prior to confirming whether the moisture is within the threshold target range.

In one or more examples, moisture may be measured via a programmed and calibrated moisture balance. Moisture packs and/or other wetting processes such as spraying the product with water may be used to increase moisture if found to be too low.

That is, moisture packs and/or other wetting processes may be used to increase the moisture if the moisture is less than a lower threshold of the threshold target range. In a case where the threshold target range for moisture is between 10% to 15% by weight, the lower threshold may be 10% and an upper threshold may be 15% by weight. Thus, in this case, if the moisture is determined to be less than the 10% lower threshold, then moisture packs and/or other wetting processes may be used to increase the moisture to be within the 10% to 15% by weight threshold target weight.

It is noted that a wetting process may improve RF absorption and thus may be desirable at least in this regard. For example, due to improved RF absorption, the wetting process may help to improve an overall log kill, even at the same final temperature as another product that has not undergone a wetting process. That is, if two products are treated to the same temperature via RF processing, the product with the higher moisture content will have a higher log kill. Almonds are an example product where a wetting process is often carried out prior to RF processing, as almonds usually have a moisture content that is less than a lower threshold of a threshold target range for almond RF processing. Thus, the wetting process may help to improve the log kill in almond processing.

However, there are cases where too much moisture may lead to undesirable results. In the case of cannabis, for example, undesirable decarboxylation may occur if the cannabis moisture content is too high when beginning RF processing. Thus, in some examples, if the product moisture content is higher than an upper threshold of the threshold target range, then the product may undergo a drying process to reduce the moisture content. Once the moisture is confirmed to be within the threshold target range at step 404 of method 401, method 401 includes packaging the separated material at step 406. In at least one example, the material (e.g., agricultural plant product being processed such as cannabis) may be packaged into containers that are compatible with RF treatment. For example, the material may be packaged into containers, where the containers comprise a material that have low dielectric properties, with no metal components, and which do not have conductive ink. The containers into which the material is packaged may be containers 14 shown at FIG. 1, in at least one example. The containers may be bags, in at least one example.

The material packaged into the containers may be packed uniformly to help ensure uniform RF absorption. For example, in a case where the material being processed is cannabis, the cannabis may be packed uniformly into the containers (e.g., containers 14) to ensure uniform RF absorption at step 406. The one or more containers may be bags in at least one example.

Following step 406, the one or more containers (e.g., containers 14) are then placed into a processing tray (e.g., processing trays 15) made of low dielectric material at step 408. The one or more containers are packed uniformly such that the container heights are all at the same level. As in FIG. 1, the one or more containers may be bags in at least one example.

In one or more examples, the processing tray may include an assistive material such as a cover (made of low dielectric material) that sits atop the containers of material (e.g., cannabis) to apply pressure and ensure a consistent height. In at least one example, set heights may be at marked intervals of the processing tray and secured mechanically. Additionally, in at least one example, contoured corners may be included in the processing tray and cover to present a more rounded and consistent shape in these areas. Any such assistive materials may be flexible to allow multiple configurations, e.g., one bag or multiple bags, and bags with different product heights for different runs. The height of product inside the one or more containers processed at the same time is thus advantageously the same.

Turning now to FIG. 4B, FIG. 4B shows an example method 403 for preparing the material for testing if method 303 has been selected for microbial testing. It is included as an additional step, in addition to method 401 at step 200 of method 201. Method 403 includes placing a subsample into a subsample container at step 410. It is noted that the subsample may be a ground and blended subsample, in at least one example. For example, the subsample at 410 may be a subsample such as discussed at least at step 312 of method 303. The subsample container may be a container such as 14*d*, 14*e*, 14*g*, and 14*i* discussed at FIG. 1. In at least one example, the subsample container may be a pouch.

Thus, 412 may include one or more of the features discussed concerning step 406 and step 414 may include one or more of the features discussed concerning step 408, with the exception that the subsample container containing the subsample is packaged into the container rather than directly packaging the material (e.g., separated buds or trim material) to be treated into the container. It is noted that the bud and trim may be separated such that the bud is treated in one process and the trim is treated in another process. Further, in at least one example, the subsample container may be positioned as discussed above at FIG. 1. For example, the subsample container holding cannabis (e.g., ground cannabis) may be embedded within cannabis (e.g., unground cannabis) held in another container.

Looking back to FIG. 2, after receiving the prepared material for treatment or processing at step 200, step 300 of method 201 includes receiving a processing tray (e.g., processing tray 15) in an RF processing chamber. It is noted that the prepared material may be also be referred to herein as product. In at least one example, the processing tray having one or more probes (e.g., temperature probes 16) positioned in the prepared material that is to undergo RF processing. A positioning of the probes may depend on the representative temperature desired based on historical temperature distribution studies. For example, at least one of the probes may be positioned halfway through the product. Additionally or alternatively, a probe may be positioned a third of the way from the bottom of the processing tray. In further examples, a probe may be inserted into the side of the processing tray and into the product.

Additionally or alternatively, a contactless temperature monitoring approach may be implemented. In cases where only contactless temperature monitoring is implemented, there may be zero probes positioned in the prepared material that is to undergo RF processing. In examples where more than one of the above-discussed approaches for monitoring temperature may be used, an average of the estimated temperatures may be used. Alternatively, or additionally, the maximum, minimum, median, or other metric may be used.

Contactless temperature monitoring (also referred to herein as non-contact temperature monitoring) may include one or more of camera monitoring, such as IR camera monitoring (also referred to as IR thermography), and microwave radiometry, where these contactless temperature monitoring approaches comprise contactless temperature sensing devices that are adapted to the RF environment through shielding, electrical isolation, etc. . . . In a case where the contactless temperature monitoring includes camera monitoring, the camera monitoring may include a camera positioned so that a lens of the camera is able to view between a first electrode assembly (e.g., first electrode assembly 18) and a second electrode assembly (e.g., second electrode assembly 20) of an RF chamber. The camera may be an infrared (IR) camera in at least one example, and the IR camera may be able to detect a surface temperature of items undergoing RF heating (e.g., containers, trays, prepared material, etc.).

If the camera is positioned within the RF chamber, it is noted that the camera may be protected by a Faraday cage while RF processing is underway. That is, while RF heating is actively being carried out and RF waves are being generated, the camera may be positioned within a Faraday cage for protection. When RF heating is not actively being carried out, the camera may be removed from the Faraday cage and the camera may take a measurement (e.g., record a surface temperature of the items positioned between the electrodes). After the camera has taken the measurement, the camera may be re-positioned within the Faraday cage again, and RF heating may be carried out again. It is noted that the positioning and re-positioning of the camera within the Faraday cage may be automatically carried out, in at least one example.

In examples where more than one of the above-discussed approaches for monitoring temperature are used (e.g., more than one of temperature probes, IR camera monitoring, microwave radiometry), if one of the approaches yields a temperature estimate that differs from the remaining temperature estimates by more than a threshold amount, then the estimate that differs from the remaining temperature estimates by more than the threshold amount may be determined to be an erroneous estimate. This erroneous estimate may then be excluded from calculations for estimating the temperature during the RF processing.

Based on the surface temperature detected, a temperature of the prepared material may be predicted. Predicting the temperature of the prepared material based on the surface temperature may take into account one or more product characteristics, in at least one example. These one or more product characteristics may include one or more of the type of material (e.g., cannabis, leafy vegetables, nuts, fruits, a specific type of nut or fruit, etc.), a moisture content, weight, etc. The one or more characteristics may be received via a user input prior to processing. For example, the one or more characteristics may include product characteristics such as those discussed at step 200 of FIG. 2. The one or more product characteristics may be used in conjunction with the surface temperature detected to predict the temperature of the prepared material. It is noted that the predicted temperature of the prepared material may be a predicted minimum temperature of the prepared material. Alternatively, the predicted temperature of the material may be a predicted average temperature of the prepared material or the predicted temperature of the material may be a predicted maximum temperature of the material. By taking into account one or more product characteristics when predicting the temperature of the prepared material via camera monitoring, the temperature monitoring may advantageously be attuned to the particular prepared material being processed. Thus, improved accuracy in the temperature predictions may result.

In a case where the contactless temperature monitoring includes IR radiometry, electromagnetic signals may be used to model a temperature of the items within undergoing RF heating (e.g., containers, trays, prepared materials, etc.). These one or more product characteristics may include one or more of the type of material (e.g., cannabis, leafy vegetables, nuts, fruits, a specific type of nut or fruit, etc.), a moisture content, weight, etc. The one or more characteristics may be received via a user input prior to processing. For example, the one or more characteristics may include product characteristics such as those discussed at step 200 of FIG. 2. The one or more product characteristics may be used in conjunction with one or more of the contactless temperature sensing devices discussed above.

As further discussed above, the predicted temperature of the prepared material may be a predicted minimum temperature of the prepared material. Alternatively, the predicted temperature of the material may be a predicted average temperature of the prepared material or the predicted temperature of the material may be a predicted maximum temperature of the material. By taking into account one or more product characteristics when predicting the temperature of the prepared material via one or more contactless temperature sensing devices, the temperature monitoring may advantageously be attuned to the particular prepared material being processed. Thus, improved accuracy in the temperature predictions may result.

In at least one example, receiving the processing tray in the RF processing chamber may include actuating a conveyor to position the RF processing tray in the RF processing chamber. Such positioning of the RF processing tray to be within the RF processing chamber may be similar to the positioning of processing tray 15*b* shown in FIG. 1, for example. It is noted that there may be one or more containers in a processing tray, such as shown at FIG. 1. Further, in at least one example, there may be more than one tray received in the RF chamber for processing at step 300.

In one or more examples, receiving the processing tray in the RF processing chamber may include closing one or more doors of the processing chamber.

Following step 300, method 201 includes determining one or more run parameters for an RF process at step 400. The one or more run parameters include one or more temperature thresholds for use during the RF process (e.g., treatment temperature, control temperature, temperature spread, and resumption thresholds) as well as time thresholds for use during the RF process (e.g., equilibration timer and treatment time thresholds). The one or more determined run parameters further include target log kill values. The actuators of the RF system may be controlled based on the one or more parameters determined at step 400.

Determining the one or more run parameters may include receiving a recipe selection from an available set of recipes at 450. The recipe selection may be received via a user input to one or more user input sensors (e.g., user input sensors 36). For example, the user input may be received at an HMI of the RF system, where the recipe options for selection at the HMI may allow the user to select a recipe for a product type and a desired processing intensity. For example, the HMI may allow a user to select that one of a gentle, normal, or aggressive processing intensity is desired. Additionally or alternatively, the recipes provided via the HMI may allow a user to select the product type such as cannabis or other plant products and an initial moisture content of the product. The initial moisture content of the product may be a moisture content (e.g., by weight) that the product is estimated to be at for the start of the RF processing. The moisture content may be estimated via a moisture probe, in at least one example.

In this way, the user may be able to easily select the type of processing desired for a particular product without having to specifically indicate requirements such as the specific temperatures (e.g., control temperature, treatment temperature, temperature spread), treatment times, and treatment targets (e.g., microbes that are to be reduced and their associated log kill target values). It is noted that one or more of these requirements may be associated with the recipe selected by the user and that the one or more run parameters are determined based on these associated requirements. Thus, when the recipe selection is received at step 450, the associated one or more run parameters are also specified.

Additionally or alternatively, one or more product characteristics may be received at 460 to determine the one or more run parameters for step 400. The one or more product characteristics may be manually received via a user input by way of one or more user input sensors. Looking briefly to FIG. 5A, it is noted that receiving the one or more product characteristics at step 460 may include one or more of the steps described at method 501. In particular, method 501 may include receiving product characteristics of the material to be processed at step 502. The product characteristics may be received via a user input by way of one or more of the user input sensors described at FIG. 1, for example. Such product characteristics may include one or more of the type of product (e.g., cannabis), a weight, an initial moisture content, and one or more sensitivities for quality retention. Such sensitivities for cannabis may include quality indicators such as one or more of color change sensitivity, trichome damage sensitivities, and decarboxylation, for example. It is noted that color change sensitivity may vary from strain to strain. As to trichome damage sensitivity, it is noted that trichome damage may lead to terpene loss.

Additionally, method 501 may include receiving one or more desired treatment targets at step 504 to determine the one or more run parameters. These one or more desired treatment targets may include one or more of a desired speed of process (e.g., fast process vs. regular process) for the product treatment and a desired target for treatment (e.g., *E. coli* reduction or specific log kill for total yeast and mold). The desired target for treatment may be used to calculate the target log kill values that form part of the one or more determined run parameters.

Responsive to the product characteristics received and the one or more desired treatment targets, one or more run parameters are determined for the system settings at step 506. Then, at step 508, the one or more run parameters for step 400 are automatically output for use in carrying out the RF process.

In at least one example, the sensitivities for quality retention of a product may include one or more chemical compounds in the product being processed. Thus, in the case of cannabis, for example, a formula for predicting an amount of decarboxylation of THCA into Delta-9 THC upon undergoing RF treatment may be included as part of the calculation process at method 501. Additional predictive formulas for other variables of interest, such as terpene loss, log kill estimates for various pathogens, including *E. coli, Salmonella, Aspergillus*, etc. may further be included. Each of these formulas include one or more of a temperature time history and an RF power history, and each of these formulas may be stored at the controller or be accessible via a remote computing device to perform the calculations at method 501.

As one example, user inputs may be received to specify an initial moisture, temperature time history, and an RF power time history.

Then, via these predictive formulas that have been developed, one or more run parameters such as an RF power level, target temperature, and duration of treatment may be calculated in order to accommodate the user's preference.

For example, if a user cares about high throughput and terpene loss, but not decarboxylation, and wants to meet regulatory requirements for *Aspergillus* with product that has an initial count of 10,000 CFU/g, then an optimization algorithm may be employed at step 400 to minimize a performance index comprising terms related to treatment time and predicted terpene loss, with a constraint on log kill for *aspergillus* being higher than the amount needed to meet regulatory requirements. The various terms in the performance index may be weighted in accordance to the relative importance among such terms. There are a number of function optimization algorithms that one can select from, to achieve such desired optimization.

While the most common treatment mode is to raise temperature to a fixed target and then hold the temperature for a specified amount of time, via this particular approach, it is possible to manipulate an entire profile such that there are a multitude of temperatures and different hold times. Such an approach may be particularly beneficial in examples where dependencies of the performance metrics (e.g., decarboxylation, terpene loss, log kill) are a nonlinear function of the manipulated variables (e.g., time, temperature, RF power).

In this approach, the performance index would comprise terms involving the time integral of terms that contribute to predicted quality, and predicted log kill, where the function within the integral is dependent on the temperature profile and RF profile. There are a number of functional optimization algorithms that may be used to achieve such desired optimization without departing from the scope of the present disclosure.

In at least on example, such an optimization calculation may be carried out on a computer that is separate from a controller of the RF system. The results may then be transferred to the controller of the RF system once optimization has completed, to provide parameters to the controller for control of the treatment process. The parameters may be stored in the memory system of the controller for recall when the desired process is utilized for a process run.

In another embodiment, where the desired run parameters may differ from run to run, the process parameters may be determined on demand. In this situation, the run preferences may be received via an HMI 39. For example, the run preferences may be received via one or more user inputs received by way of one or more user input sensors 36 of HMI 39. The run preferences may be displayed via display 37 of HMI 39.

In at least one example, the preferences and product conditions (e.g., weight, number of bags, initial moisture, initial microbial counts, initial terpenes and initial THCA, Delta-9 THC levels) may be entered via the HMI 39 (e.g., via one or more user inputs received by way of one or more user input sensors 36). In at least one example, the preferences and product condition information may be communicated to a remote computer server for processing. Additionally or alternatively, the preferences and product condition may be processed via a controller of the RF system (e.g., controller 40). In cases where the controller of the RF system carries out the customization calculations (also referred to as the optimization calculations), such calculations may be an emulation of the customization calculation that would be carried out via the remote computer server in order to reduce computational requirements at the controller. Such customization calculations performed at the controller may be merely a set of table lookups and interpolations between similar, adjacent parameter sets, for example.

Once a customization calculation has been carried out based on the preferences and product conditions received, a resulting set of run parameters is determined. In cases where a remote computer server performs the customization calculations, the resulting set of parameters may then be communicated back to the controller (e.g., controller 40) of the RF system (e.g., RF system 10). Alternatively, in examples where the customization has been carried out at the controller of the RF system, the resulting set of run parameters does not need to be communicated back to the controller.

The resulting set of run parameters specifies run parameters are thus used as the one or more run parameters for step 400.

Figure 5A:
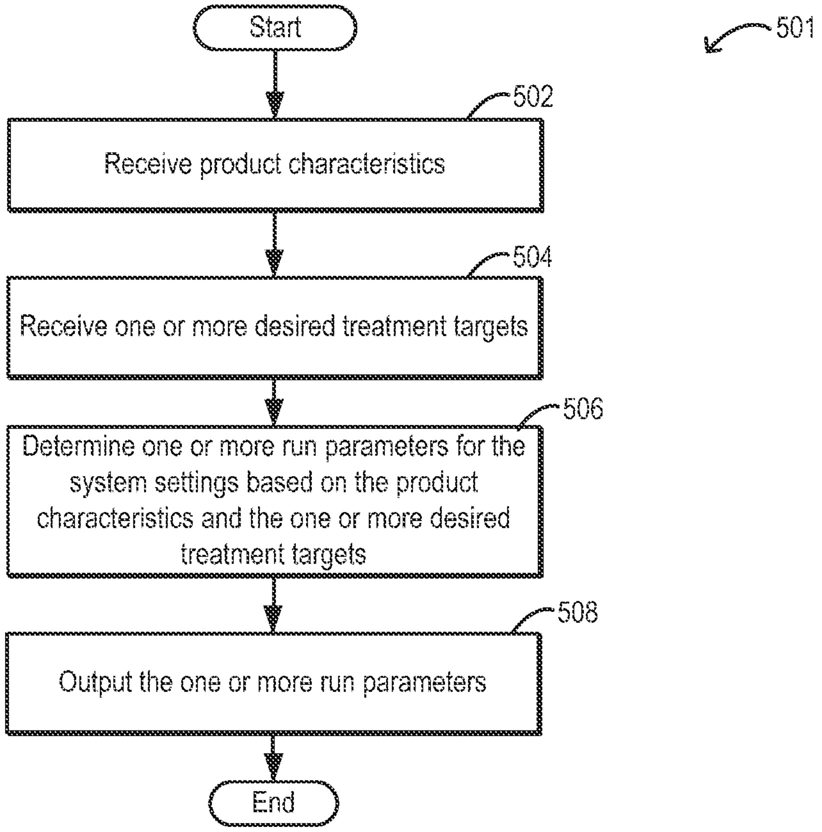
FIG. 5A shows a flow chart of a sixth method, according to one or more examples of the present disclosure.
Figure 5B:
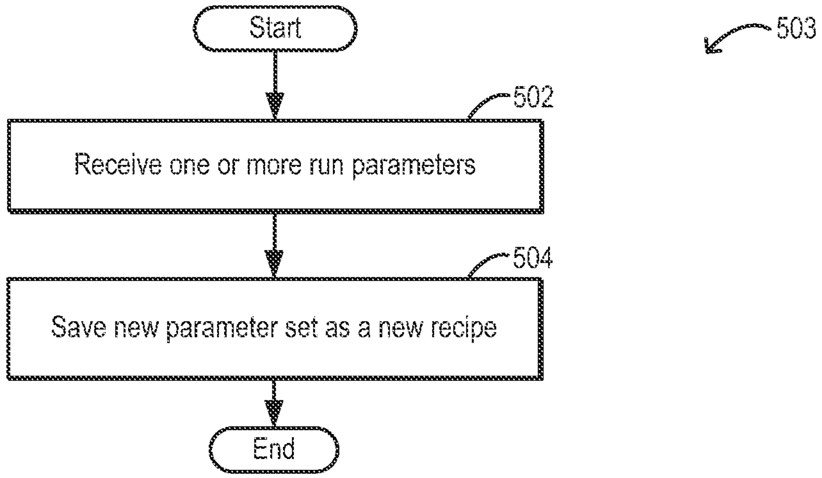
FIG. 5B shows a flow chart of a seventh method, according to one or more examples of the present disclosure.

Additionally or alternatively, determining the desired one or more run parameters at step 400 may include receiving one or more run parameters, such as shown at method 503 at FIG. 5B. As seen at method 503, the one or more run parameters may be received at step 502, and these one of more run parameters may be saved as a new parameter set for a new recipe. The desired one or more run parameters at step 400 may then be determined based on this new recipe.

After carrying out at least one of steps 450, 460, 470, the one or more desired run parameters are determined at step 400. In at least one example, the controller may output an indication that the run is ready to start (e.g., via one or both of display 37 and sound generator 38).

Prior to starting RF processing of the product at step 500, it is noted that the RF chamber may be heated at step 400. For example, the RF chamber may be heated to a target RF chamber temperature via a heating element (e.g., heating element 41) and air flow element (e.g., air flow element 43) based on a target treatment temperature, adjusting air flow during processing (e.g., at the second stage) via the air flow element, and then cooling the RF chamber at the end of the process.

The RF chamber environment affects temperature uniformity within the product being processed (e.g., cannabis). In a cold chamber, for example, the heat of the portion of the product near the periphery is transported from the product and out into the chamber from the effects of conduction and convection, and to some extent, thermal radiation. Such conditions may thus result in temperature non-uniformity, where the internal portions of the product are at processing temperatures while the portions near the periphery are colder. To counteract this effect, however, the RF chamber air is heated via a heating element, and an air flow element such as a fan may be used to circulate the heated air throughout the chamber for temperature uniformity within the chamber. In such examples where the heated air is circulated by the air flow element in the RF chamber, the inventors have found that the temperature of the air must be heated close to the processing temperature of the product in order to avoid the wind chill effect from the air flow element moving the heated air. Thus, in examples where the heat is circulated by the air flow element in the RF chamber, the air flow element may not be activated until an ambient temperature within the RF chamber is less than a threshold from a target processing temperature. The RF chamber temperature may be determined based on a temperature sensor positioned within the RF chamber, in at least one example. For example, the threshold may be that the RF chamber temperature is less than approximately 10° C. from the processing temperature or that the RF chamber temperature is less than approximately 5° C. from the processing temperature. Otherwise, the air flow will only serve to draw heat away from the product if the heated chamber air is at a lower temperature than the product being processed.

It is noted that there are many ways in which the RF chamber air heating and air flow can be used without departing from the scope of the present disclosure. For example, heaters can be turned on and a high air flow may be used to get all the components surrounding the RF chamber to reach a desired temperature (e.g., a processing temperature). Once the desired chamber air temperature is reached in a stable manner, and the product has reached the desired processing temperature, the air flow may be reduced or turned off altogether. In another usage, at the end of RF processing, the fan may be turned on at high speed, with heaters off, to quickly bring the chamber to ambient temperature and avoid overprocessing the product. The temperature of the chamber air may be monitored via one or more temperature sensors positioned within the RF chamber that are part of sensors 54 in communication with controller 40 of control system 52. The heating element (e.g., heating element 41) and the air flow element (e.g., air flow element 43) may be controlled as actuators 56 of the control system 52, where the controller 40 controls the heating element and the air flow element based on feedback from the temperature sensors to achieve the heating of the RF chamber prior to the start of RF processing, as described above.

Continuing at FIG. 2, after step 400 (which may include one or more of the steps discussed at FIG. 5A and FIG. 5B) method 201 includes starting the RF process. The RF process may be started in accordance with one or more of the steps discussed at FIG. 6A and FIG. 6B.

Figure 6A:
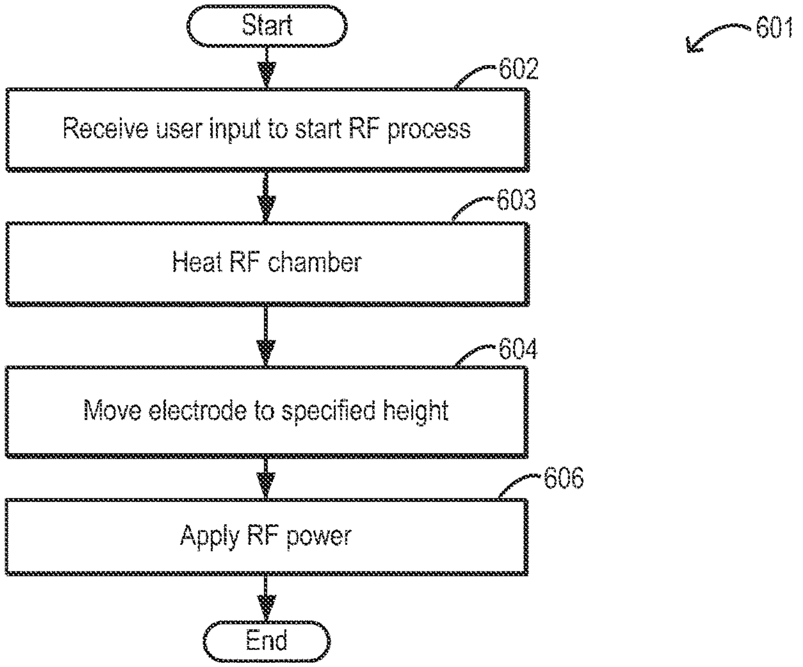
FIG. 6A shows a flow chart of an eighth method, according to one or more examples of the present disclosure.

Turning to FIG. 6A, FIG. 6A shows an example method 601 for starting the RF process at step 500 of method 201. Method 601 may include receiving a user input to start the RF process at step 602. For example, the user input may be received via one or more of the user input sensors (e.g. user input sensors 36 of HMI 39).

Following step 602, step 603 of example method 601 includes heating the RF chamber. Heating the RF chamber may be carried out as described in relation to step 400, for example.

Following step 603, method 601 includes moving an electrode (e.g., first electrode assembly 18) to a specified height at step 604. The electrode may be an electrode positioned above the prepared material, for example. In at least one example, the electrode may be moved via a motor, such as motor 34 shown in FIG. 1. The specified height, may be one of the run parameters specified when determining the one or more desired run parameters at step 400.

In at least one example, the specified height may be predetermined and stored in a controller of the RF system. To determine the specified height, an initial process setting is carried out whereby a plurality of trial runs are performed to determine the specified height setting to assign for a set of product parameters (e.g., quantity of product, number of containers, height of the containers when placed into the processing tray) and initial moisture of the product.

A candidate electrode height is selected based on a desired initial trial distance between the electrode and a top of the product. A process run is then initiated to observe whether a suitable amount of RF energy is absorbed or not. RF power absorption may be deemed insufficient if the amount absorbed is less than ~50% of the expected power. The RF power absorption may be determined based on a temperature of the product, in at least one example. Additionally or alternatively, the RF power absorption may be determined based on an RF power measurement that is based on outputs of the RF circuitry. In this situation, the process may be stopped and the electrode adjusted to be closer to the product.

In some examples, RF power absorption may further be deemed too high if the RF power absorption oscillates continuously or the rate of temperature rise is too high. In this situation, the process may be stopped and the electrode is adjusted to be farther away from the product. Once a suitable electrode height is determined, this value is stored in the controller as the specific height along with the other process conditions into a recipe. The recipe may then be stored in the controller as a part of the set of recipes available for selection, such as discussed at step 450. It is noted that the specific height determined in this initialization process setting is suitable for a given range of initial moisture and specific weight and presentation of the product. A different set of moisture and product presentation would require an additional process setting exercise, however.

In at least one example, an approach to automate the electrode height selection may mimic the process setting procedure, using computer logic to replace the manual process. In such examples, with product in place and the process set to begin, the electrode may be moved to an initial position, given information on the height of the product (or an initial position entered by the user).

RF power may then be turned on and an RF power absorption response of the product is sensed and recorded until a set amount of time has passed or until a determination of RF absorption behavior could be made.

The RF power is then turned off and the electrode is moved to a different height, approximately 5-10 mm away from the first height as part of a bracketing process. The RF power is turned on again, and the product's RF power absorption behavior is recorded again. This bracketing process is then repeated enough times until a suitable height for the specific height is determined. That is, the bracketing process is repeated until at least one height is too high, where the RF power continuously is above the expected power absorption, based on initial moisture, weight, and other characteristics, and until at least one height is too low, where the RF power absorbed is less than approximately half of the expected power absorption based on initial moisture, weight, and other characteristics.

Once a suitable height has been bracketed, an appropriate height for the specific height is determined, the electrode is moved to that specific height, and the actual treatment process may proceed to full completion.

In another embodiment, alternate electrode heights may be trialed only if the heights tested so far have not met expectations. Once a suitable height has been found, processing continues without further interruption for electrode height adjustment.

In some applications of RF heating, there may be an initial heat up phase using a relatively high level of RF power, followed by a temperature hold phase using a relatively low level of RF power. In these applications, it may be desirable to adjust the electrode height after the end of the heating phase and prior to the beginning of the temperature hold phase. In this situation, the electrode would be raised to a certain amount based on the information collected earlier during the initial electrode height adjustment procedure. Once the new electrode height has been reached, the system then begins the low RF temperature hold phase.

The automated electrode height adjustment may be utilized in any manner suitable for operation of the RF system. For example, this feature may be enabled all the time so that the user can utilize any combination of product quantity, number of bags and initial moisture. Or, to save time, the feature may be used only when product quantity, moisture, and presentation conditions change substantially from typical values. Further, in at least one example, the electrode height may be varied continuously throughout the RF treatment. Such continuous variation may include varying the electrode height when RF waves are being generated, for example. By continuously varying the electrode height throughout the RF treatment, a finer control for the RF heating of the product may be achieved. Alternatively, however, the electrode height may be adjusted intermittently. For example, the electrode height may only be adjusted in between periods when RF waves are generated, and the electrode height may not be adjusted while the RF waves are being generated.

In one or more examples, the electrode height may further be based on a determined height of the tray and/or containers in the RF chamber for processing. For example, a laser device may be included in the RF device for determining a height of the tray and/or containers. The electrode height may then be adjusted based on the determined height of the tray and/or containers. In some examples, the electrode height may be adjusted based on a highest detected point of the tray and/or containers. The electrode height may additionally or alternatively be adjusted based on an amount of moisture of the product being processed. For example, the moisture of the product may be received via a user input as one or more of the product characteristics prior to processing or automatically measured outside of the RF chamber prior to RF processing. The moisture of the product received prior to RF processing may then be taken into account when setting the electrode height. For example, products with a higher moisture content may heat more quickly during RF processing than products that have a lower moisture content. Thus, the electrode height may be increased as product moisture content increases. The electrode height may further be decreased as product moisture content decreases. It is noted that reference to the electrode height increasing refers to adjusting the electrode height to be farther away from the product during testing. Reference to decreasing the electrode height herein refers to adjusting the electrode height to be closer to the product during testing. That is, increasing the electrode height includes increasing a distance between a first electrode assembly and a second electrode assembly, and decreasing the electrode height includes decreasing the distance between the first electrode assembly and the second electrode assembly.

Once the electrode has been moved to the specified height at step 604, RF power may be applied at step 606. In at least one example, the RF power may be applied via operation of the RF generator 28, including one or both of variable capacitor 30 and VFD 32. In at least one example, the specified electrode height may be kept fixed throughout a remainder of the RF processing during method 201 following step 604. In such examples where the specified electrode height is maintained throughout the remainder of the RF processing during method 201, a variable capacitor may be used.

In such examples, the variable capacitor may be used to control a voltage at the electrode (e.g., a top electrode such as first electrode assembly 18). The higher the voltage, the more power is applied to the product. The lower the voltage, the less power is applied. Thus, even though the electrode is maintained at the specified height, the RF power may be varied during processing.

However, in at least one example, the height of the electrode may be adjusted during the RF processing of method 201, as discussed in further detail herein.

Figure 6B:
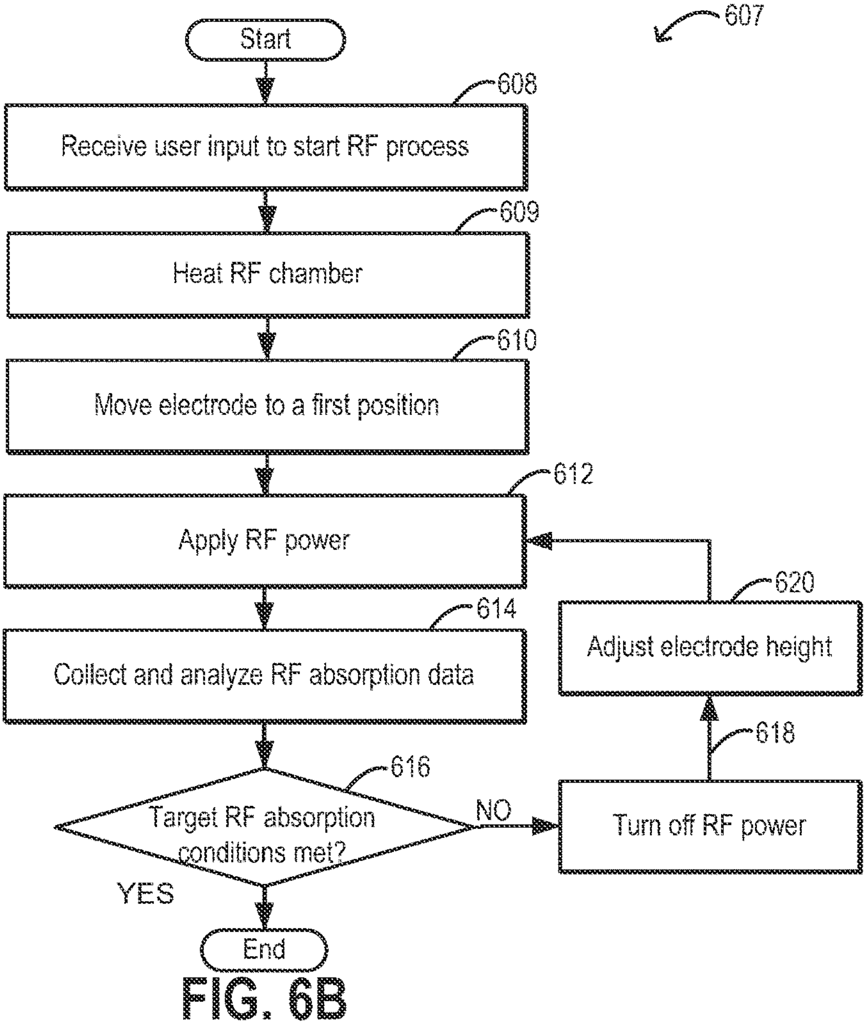
FIG. 6B shows a flow chart of a ninth method, according to one or more examples of the present disclosure.

Turning now to FIG. 6B, FIG. 6B shows another example method 607 for starting the RF process at step 400 that may be used in addition to or as an alternative to method 601. Method 607 includes receiving a user input to start the RF process at step 608. Receiving the user input to start the RF process at step 608 includes one or more of the features as with step 602 of method 601.

Following step 608, example method 607 includes heating the RF chamber at step 609. Heating the RF chamber may be carried out as described in relation to step 400, for example.

Following step 609, method 607 includes moving the electrode to a first position at step 610. Similar to step 604 of method 601, the electrode (e.g., either first electrode assembly 18 or second electrode assembly 20) may be moved to the first position via a motor, such as motor 34 shown in FIG. 1. The first height may be a same height as the specified height at step 604. However, in other examples, the first height may be different than the specified height in at least one example. The first height may be one of the run parameters specified when determining the one or more desired run parameters at step 400, in at least one example.

Following step 610, method 607 includes applying RF power at step 612. For example, the RF power may be applied via an RF generator such as RF generator 28. The RF generator may include one or both of a variable capacitor (e.g., variable capacitor 30) and a VFD (e.g., VFD 32), in at least one example.

Following step 612, method 607 includes collecting and analyzing RF absorption data at step 614. In at least one example, the RF absorption data may be based on temperature data received from one or more temperature probes (e.g., temperature probes 16) positioned in the prepared material. Additionally or alternatively, the RF absorption data may be based on moisture data received prior to processing (e.g., via a user input or from one or more moisture probes). In at least one example, the RF absorption may be based on an RF power reading. This RF power reading may be calculated based on outputs of the RF circuitry. Such an RF power reading may be output on the HMI, in at least one example.

Following step 614, step 616 of method 607 includes determining whether target RF absorption conditions have been met. The target RF absorption conditions may be one of the determined one or more run parameters, in at least one example. That is, the one or more run parameters determined at step 400 may comprise a heating profile that includes a target RF absorption. In at least one example, the target RF absorption conditions may be a rate at which the prepared material is specified to heat up per the one or more run parameters determined at step 400. In one or more examples, the target RF absorption conditions may be a range of predetermined target heating rates. Alternatively, the target RF absorption condition may be a single target heating rate.

If the target RF absorption conditions are determined to be met at step 616, then method 607 ends. If the target RF absorption conditions are determined as not being met at step 616, then method 607 proceeds to step 618 and turns off the RF power. That is, the RF generator (e.g., RF generator 28) is controlled to no longer perform RF heating. The target RF absorption conditions may be determined as not being met responsive to a heating rate that is greater than or a heating rate that is less than the range of the target heating rates. Or, in a case where a single target heating rate is the target RF absorption condition, the target RF absorption conditions may be determined as not being met responsive to a heating rate that is greater than or a heating rate that is less than the single target heating rate.

After turning off the RF power at step 618, method 607 may include adjusting the electrode height at step 620. The farther away the electrode is from the product being processed the less RF power is absorbed into the product. The closer the electrode is to the product the more RF power is absorbed into the product.

Thus, if the actual heating rate determined based on the RF absorption data at step 614 is greater than the target RF absorption conditions (e.g., greater than a single target threshold heating rate or greater than a target threshold heating rate range), the electrode height may be adjusted so that the electrode is further away from the product at step 620.

Alternatively, if the actual heating rate determined on the RF absorption data at step 614 is less than the target RF absorption conditions (e.g., less than a single target threshold heating rate or less than a target threshold heating rate range), the electrode height may be adjusted so that the electrode is closer to the product at step 620.

Following step 620, method 607 then moves to 612 once again, and steps 612, 614, and 616 are repeated until the target RF absorption conditions are met at step 616.

Looking back now to FIG. 2, after starting the RF process at step 500, method 201 includes controlling the RF heating profile at step 600. In at least one example, controlling the RF heating profile at step 600 may include automatically de-selecting one or more probes (e.g., temperature probes) at step 650. For example, for proper monitoring during control of the RF heating profile at step 600, the probes may undergo a de-selection process. Further details as to the automatic de-selection process for the probes is described in further detail at FIG. 9.

Figure 9:
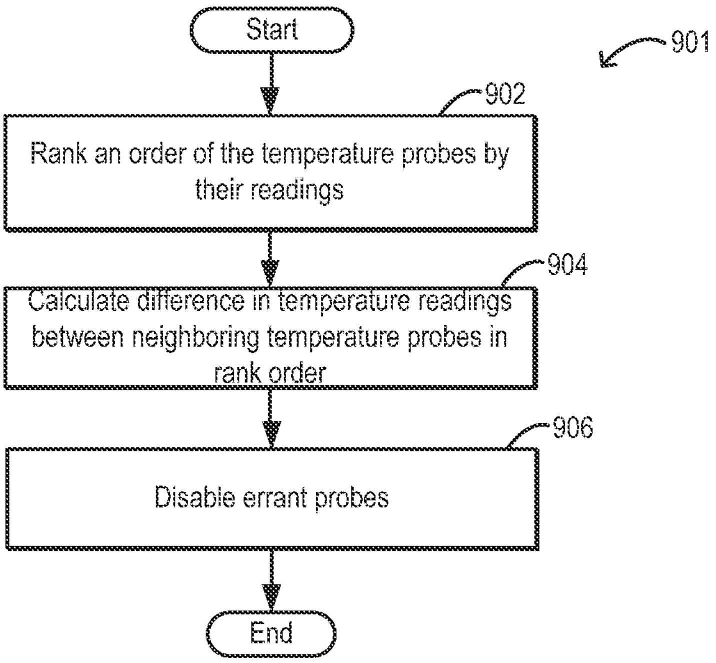
FIG. 9 shows a flow chart of a thirteenth method, according to one or more examples of the present disclosure.

In particular, looking to FIG. 9, FIG. 9 shows an example method 901 for performing a probe de-selection process.

Oftentimes, a temperature probe may start behaving erratically during a process for various reasons such as inaccurate positioning of the probe, probe failure, non-homogeneous product. For example, the reading may fluctuate rapidly or may otherwise be consistently high or consistently low compared to the other probes. To prevent an erratic temperature reading from disrupting the proper operation of the RF power control, one or more errant probes may be de-selected via the human machine interface (HMI) screen when they observe such erratic behavior. While the probe's readings are still visible on the HMI screen, its values are no longer used in calculating temperature metrics for control or treatment timer purposes.

Method 901 may detect unusual behavior and automatically de-select the probe from the calculation of the maximum, minimum, or average values for use as either control temperature or treatment temperature via a de-selection algorithm. In at least one example, method 901 may include ranking an order of the temperature probes by their readings at step 902, where their readings refer to their temperature output readings. Method 901 may be implemented throughout a treatment process, in at least one example.

After ranking the temperature probes at step 902, method 901 may include calculating a difference in temperature reading between each probe and an immediate neighbor of each probe in rank order at step 904.

Following step 904, if the difference between the two highest ranked probes is larger than approximately 120% of the total difference among the remaining probes, then method 901 includes disabling the highest ranked probe at step 906. It is noted that the highest ranked probe is the probe that had the highest temperature output reading.

Likewise, if the difference between the two lowest ranked probes is larger than approximately 120% of the total difference among the remaining probes, then the lowest ranked probe may be disabled at step 906. The lowest ranked probe is the probe that had the lowest temperature output reading.

To detect the situation where two probes may be errant, a potential algorithm may involve a similar approach. In particular, the temperature probes may be ranked by their readings. The difference in temperature reading between each probe and their immediate neighbors in rank order may be calculated. If the difference between the second highest ranked probe and the third highest ranked probe is larger than approximately 150% the total difference among the remaining lower ranked probes (e.g., disregarding the highest ranked probe), then the two highest ranked probes may be disabled.

If the difference between the second lowest ranked probe and the third lowest ranked probe is larger than approximately 150% the difference between the total difference among the remaining higher ranked probes (e.g., disregarding the lowest ranked probe), then the two lowest ranked probes may be disabled. Though 120% and 150% has been provided as an approximate difference for disabling the probes, it is noted that other differences may be possible to adjust a sensitivity for disabling the probes. Moreover, in at least one example, a standard deviation threshold may be set as opposed to a percentage difference threshold for determining which probes to disable.

Figure 7:
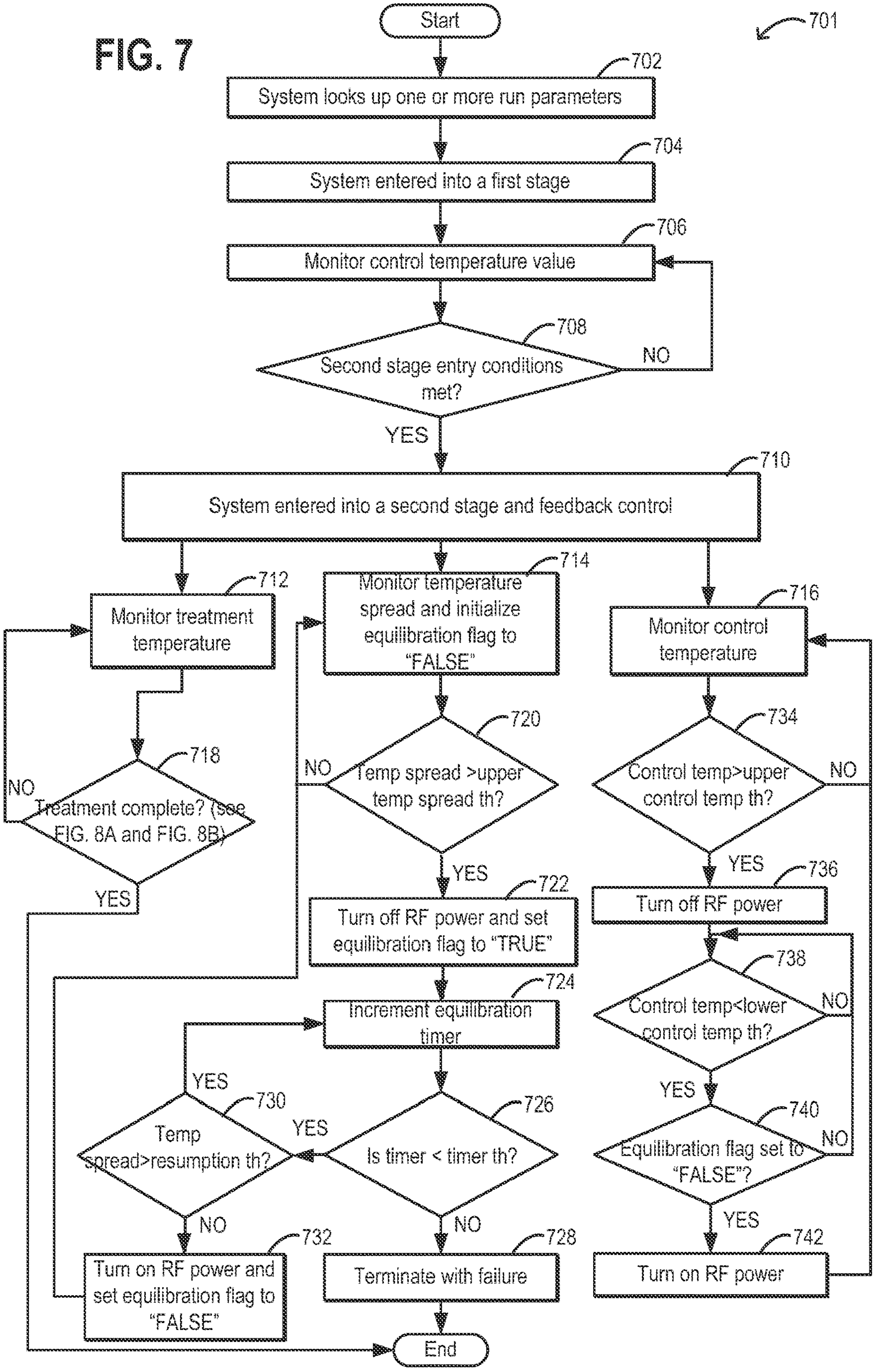
FIG. 7 shows a flow chart of a tenth method, according to one or more examples of the present disclosure.

Turning now to FIG. 7, FIG. 7 shows an example method 701 for controlling the RF heating profile as at step 600. Method 701 begins at step 702, where the system may look up one or more run parameters for the particular process being carried out. The one or more run parameters may be based on the one or more run parameters determined at step 400, in at least one example. After determining the one or more run parameters at step 702, method 701 includes entering the system into a first stage at step 704 and a control temperature value is monitored at step 706. The control temperature may be based on one or more temperature probe sensor outputs. It is noted that in at least one example, the control temperature value may be monitored based on a group of one or more temperature probes that have already undergone an automatic de-selection process. The automatic de-selection process (such as mentioned at step 650) is discussed in further detail at FIG. 9.

In the first stage, RF power, applied at a high level (e.g., ~2 kW nominal), may be used to heat the product to within a few degrees of the target temperature. In particular, the RF power is used to heat the product (that is, the prepared material) to a first stage temperature threshold, where the first stage temperature threshold is less than a target temperature threshold. One or more temperature probes, such as temperature probes 16 may be used to monitor the temperature of the product throughout method 701, in at least one example.

The first stage may be carried out with feedback control. In one or more examples, the control system may control the RF power such that the temperature follows a predetermined heating rate (e.g., specified as ° C. per minute). This predetermined heating rate may be a constant heating rate, in at least one example. However, in at least one example, the predetermined heating rate may be varied based on time. Additionally or alternatively, the predetermined heating rate may be varied based on reaching certain temperature conditions within the product and/or for the RF chamber (the RF chamber environment). Additionally or alternatively, the control system may control the RF power to follow a predetermined RF profile for the amount of RF power to be applied.

The inventors have found that if a heating rate is relatively high, a temperature spread tends to increase to a point that the use of equilibration is required. On the other hand, if the temperature rise is kept relatively low, the temperature spread tends to stay relatively low. It is noted that temperature spread refers to a temperature differential throughout the product, where a lower temperature spread represents a more uniform temperature throughout the product compared to a higher temperature spread that represents greater variance in temperature throughout the product.

Additionally or alternatively, a time varying temperature profile or a time varying temperature rate profile may be implemented during the first stage. Without being bound by theory, increased temperature spread resulting from a high heating rate may be due to an effect known as thermal runaway, whereby the ability to absorb RF energy increases with increasing temperature. If a pocket of product happens to be slightly hotter than other parts of the product, that pocket will have a higher ability to absorb RF, and thus its temperature starts to accelerate faster than the other, cooler parts of the product resulting in increased temperature spread. This differential RF absorption is counteracted, to some extent, by the normal heat transfer from high temperature areas to low temperature areas. If the RF power is high, the inventors have found that a large temperature spread ensues, which may be due to the thermal runaway effect dominating over the heat transfer effect. If, on the other hand, RF power is kept low, the inventors have found that a smaller temperature spread ensues, which may be due to the heat transfer effect being able to mitigate some of the differential heating brought on by thermal runaway.

The RF power may be controlled by a PID controller to maintain a heat-up rate within predetermined range. Such an approach prevents hot zones inside a container from becoming thermal runaway zones. Maintaining a tight temperature spread further allows the minimum temperature to be high while keeping the max temperature below a max threshold, which results in high pathogen reduction, while maintaining low decarboxylation and terpene loss.

Following step 706, method 701 includes determining whether second stage entry conditions have been met at step 708. The second stage entry conditions may include whether the product has been heated to the first stage temperature threshold. Responsive to the product being less than the first stage temperature threshold, method 701 moves back to monitoring the control temperature value at step 706 while continuing to operate in the first stage (and thus with the high level RF power still being applied).

Responsive determining that the product is equal to the first stage temperature threshold, method 701 includes entering the system into a second stage and engaging feedback control. For example, the feedback control may be a cascaded proportional integral derivative (PID) control at step 710. It is noted that the overall control logic and steps for the second stage at method 701 are referred to as feedback control. Within the feedback control of method 701, there may be one or more control loops. Example control loops that may be included in the feedback control are described herein. These control loops may be feedback control loops.

For example, in this second stage, a temperature error (difference between a control temperature target and an actual control temperature) may drive a temperature feedback control loop, such as a PID control loop. The output of this loop is a desired RF power.

In particular, an error between the actual RF power and the desired RF power is used to drive a power feedback control loop. The output of the feedback control loop drives the VFD motor, which operates the variable capacitor, which governs the RF power. The VFD motor may instead be a positioning motor, in at least one example. Furthermore, additionally or alternatively, the feedback control loop may adjust a height of the top electrode.

Since the RF power can only increase temperature but not decrease it, the controller is designed to turn off RF power once the control temperature has exceeded an upper bound threshold above the temperature target. RF heating resumes when control temperature falls below a lower bound threshold, provided the temperature spread is within limits.

Thus, upon entering the second stage at step 710, method 701 includes simultaneously engaging monitoring of the treatment temperature at 712, monitoring a temperature spread at 714, and monitoring a control temperature at step 716. It is noted that an equilibration flag is set to "FALSE" upon entering the second stage, where the equilibration flag being set to false means that the system is not in a state of waiting for temperature spread to equilibrate within an acceptable range (e.g., to be less than the upper temperature spread threshold). When the equilibration flag is set to "TRUE," it is noted that the system is in a state of waiting for the temperature spread to equilibrate to be within an acceptable range (e.g., to be less than a resumption threshold). The treatment temperature is a temperature that is used to increment a treatment timer responsive to the treatment temperature exceeding a target temperature, and the control temperature is a temperature that may be used as an input for the feedback control of method 701. The control temperature may be a temperature that is set to prevent overheating of the product. For example, responsive to the control temperature exceeding an upper control temperature threshold, the RF power may be turned off. The temperature spread is an estimated variation of temperature in the product undergoing the RF treatment. Over the course of an RF treatment, a temperature spread decreases as the product begins to heat to a more uniform temperature.

In one or more examples, the temperature spread may be determined based on temperature probe outputs. Additionally or alternatively, the temperature spread may be a temperature variation of the product determined based on contactless temperature predictions. For example, one or more contactless temperature sensing approaches and devices such as those discussed above may be used to estimate a temperature variation of the product (that is, the temperature spread of the product).

An upper temperature spread threshold may be set to help heat the product more evenly during processing. For example, if the temperature spread (that is, variation in product temperature) is determined to be greater than the upper temperature spread threshold, then RF power may be turned off to allow heat to dissipate throughout the product. In this way, advantages in meeting log kill thresholds throughout the entire product may be achieved. Further, hot spots in the product may be prevented during processing while still meeting such log kill thresholds throughout the product. Thus, product quality may be improved compared to approaches without strategies to help ensure even heating.

To help enable incrementing of the treatment timer, the treatment temperature and the control temperature is set so that the temperature spread sits within the differential between the treatment temperature and the control temperature. For example, if a treatment temperature is set to 70° C., and a control temp is set to 80° C., and an upper temperature spread threshold is set to greater than 10° C., then it is possible for treatment clock to never increment. The control system maintains the control temperature near its target, and the treatment timer increments only if the treatment temperature is greater than its target. Thus, if the maximum probe reading is used for the control temperature and the minimum probe reading is used for the treatment temperature, then the temperature spread is equal to the difference between control temperature and treatment temperature. Therefore, in this example, if the spread threshold for equilibration is set higher than the control-treatment differential, there is a possibility that the control system has maintained its temperature holding goal, but the treatment temperature (the minimum probe) is below its target and equilibration processes will not have been initiated to reduce the temperature spread.

There are many strategies for how the treatment temperature, control temperature, and upper temperature spread thresholds may be set. Each of the treatment temperature, control temperature, and an allowed temperature spread act as control levers for the RF processing treatment. A table 1200 of example strategies may be found at FIG. 12A for reference. It is noted that table 1200 shown at FIG. 12A is continued at tables 1201, 1203, 1205, 1207, and 1209 of FIGS. 12B, 12C, 12D, 12E, and 12F, respectively. Tables 1200, 1201, 1203, 1205, 1207, and 1209 of FIGS. 12A, 12B, 12C, 12D, 12E, and 12F thus utilize similar reference numerals.

Table 1200 indicates a measurement mode, also referred herein as a temperature mode or temperature measurement mode. The measurement mode may determine how probe readings are processed to arrive at a value for use by the control system (in the case of control temperature) or for use by the treatment timer (in the case of treatment temperature). They may be referred to as control mode or treatment mode.

Table 1200 also shows a process strategy. The process strategy is the selection of (i) measurement mode (Min/Max/Avg) for control temperature and treatment temperature, (ii) the value of the treatment temperature target, (iii) the value of the control temperature target, (iv) the allowed temperature spread, its relation to the control-treatment differential and expected spread.

In developing each of the example strategies shown at table 1200, each strategy is developed to be meaningful, controllable, convergent, and aligned.

In terms of being meaningful, each control lever may be specified in a way that reflects their original meaning. This is to avoid confusion when monitoring a run or interpreting run data. As to being controllable, each control lever may be specified in a way that allows the lever to actually have an effect on the process. If the selection of measurement mode and spread values are such that any of the three levers is rendered useless in controlling the process, then the strategy is considered inappropriate. For a strategy that is convergent, the process strategy may result in successful completion under expected temperature spreads. A strategy that never completes successfully under expected temperature spread conditions is considered undesirable. By having strategies that are aligned, a lower than expected spread in temperature may result in a better process outcome (such as faster completion, higher log kill, or higher quality retention). A process where a lower than expected spread leads to a worse process outcome is considered undesirable.

When developing the strategies, there are three main considerations. First, the treatment temperature may be specified in a way consistent with the process goal. For example, if the process is targeted at heat resistant pathogens (such as *Aspergillus* and coliforms), the treatment temperature target may be relevant to the temperatures to kill such heat resistant pathogens, and be set at a higher level than that predicted as needed to kill less heat resistant pathogens, like yeasts.

Second, if different measurement modes are used for control temperature and treatment temperature, the specification of their target values is to be consistent with the relationship between the modes. For example, if a control temperature mode is "avg" and treatment temperature mode is "min", then the target control temperature may be higher than the target treatment temperature, since the average value is higher than the minimum value.

Third, the temperature spread limit may be less than the corresponding control-treatment differential. For example, if a control mode is "max" and treatment mode is "min", then the spread limit may be less than the control-treatment differential. If control mode is "max" and treatment mode is "avg", then the spread limit may be less than twice the control-treatment differential, with some margin. It is noted that this is for a case where the average is approximately halfway between the minimum and maximum probe readings.

Looking briefly to FIGS. 12A-12F, the control temperature mode column 1202 refers to what temperature readings are used to monitor the control temperature. Reference to "min" in the control temperature mode column 1202 means that a minimum temperature reading is used to monitor the control temperature. In a case where temperature probes are used, using the minimum temperature reading may include using a lowest output temperature reading of the temperature probes (after eliminating erroneous probes). In a case where contactless temperature monitoring is additionally or alternatively used, the minimum temperature reading may be a lowest predicted temperature for the product based on one or more contactless temperature sensing approaches and devices, such as those discussed above.

Reference to "avg" in the control temperature mode column 1202 refers to the use of an average temperature reading of the product being used to monitor the control temperature. In a case where temperature probes are used, using an average of all the temperature probe readings for monitoring the control temperature (after eliminating erroneous probes). In a case where contactless temperature monitoring is additionally or alternatively used, the average temperature reading for the product may be an average predicted temperature for the product based on one or more contactless temperature sensing approaches and devices, such as those discussed above.

Reference to "max" in the control temperature mode column 1202 refers to the use a maximum temperature reading to monitor the control temperature. In a case where temperature probes are used, using the maximum temperature reading may include using a highest output temperature reading of the temperature probes (after eliminating erroneous probes). In a case where contactless temperature monitoring is additionally or alternatively used, the maximum temperature reading may be a highest predicted temperature for the product based on one or more contactless temperature sensing approaches and devices, such as those discussed above.

Turning to treatment temperature mode column 1204, the treatment temperature mode column 1204 refers to what temperature readings are used to monitor the treatment temperature. Reference to "min," "avg," and "max," in the treatment temperature mode column 1204 are similar to "min," "avg," and "max" in the control temperature mode column 1202. Thus, for purposes of discussion, these terms are not re-described.

Looking now to potential target setting strategy column 1206, the potential target setting strategy column 1206 includes a brief description of how the settings are determined. Continuing to the spread limit for equilibration column 1208, a strategy for how the temperature spread limit upper threshold is set is described. At the scenario comment column 1210, comments as to scenarios that have been found as not practical or identical to other scenarios are included. For the driver for control target column 1212, example reasons for how the upper control temperature threshold is set are provided. At the driver for treatment target column 1214, example reasons for how the target temperature for the treatment temperature is set are provided. At the driver for spread limit column 1216, example reasons for how the upper temperature spread threshold is set are provided. At the frequency of meeting treatment column 1218, example predictions for overall frequency of completing treatment are included. At the likelihood of equilibration column 1220, example predictions for likelihood that equilibration will occur (that is, likelihood RF will be powered off to allow temperature spread reduction) are provided. At the potential upside column 1222, example desirable outcomes are listed for the strategies provided. At the potential downside column 1224, example undesirable outcomes are listed for the strategies provided. At the trade-off column 1226, example trade-off comparisons are provided. Microbial reduction column 1228, quality retention column 1230, and throughput column 1232 are included in table 1200, which enables the strategies to be easily weighed against one another prior to selection.

In one example strategy, a maximum temperature reading may be set for the control temperature and for the treatment temperature. In a case of temperature probes, the highest probe reading (after removing erroneous probes) would thus be used for both the control temperature and the treatment temperature.

In another example, a lowest temperature reading may be used for the treatment temperature. In a case of temperature probes, the lowest temperature probe reading (after removing erroneous probes) would thus be used for both the control temperature and the treatment temperature. The treatment timer being incremented based on the lowest temperature reading helps to ensure that log kill parameters are met. That is, the one or more treatment parameters for the RF treatment are set to meet a log kill threshold based on temperature readings monitored throughout the treatment. By using the lowest temperature as the treatment temperature, portions of the product with the lowest temperature are treated in a manner predicted to meet the log kill threshold. Thus, the remainder of the product would also meet the log kill threshold, as the log kill in the remainder of the product would be higher than that estimated for the portion of the product with the lowest temperature. Turning back now to FIG. 7, looking at step 712, step 712 includes monitoring the treatment temperature. Once monitoring of the treatment temperature at step 712 is engaged, method 701 includes determining whether treatment is complete based on the monitored treatment temperature at step 718 and one or more of the steps discussed at FIG. 8A and FIG. 8B, where the monitored treatment temperature is a temperature of the product. If treatment is complete, then method 701 ends. If treatment is not complete, then the treatment temperature continues to be monitored at step 712.

Figure 8A:
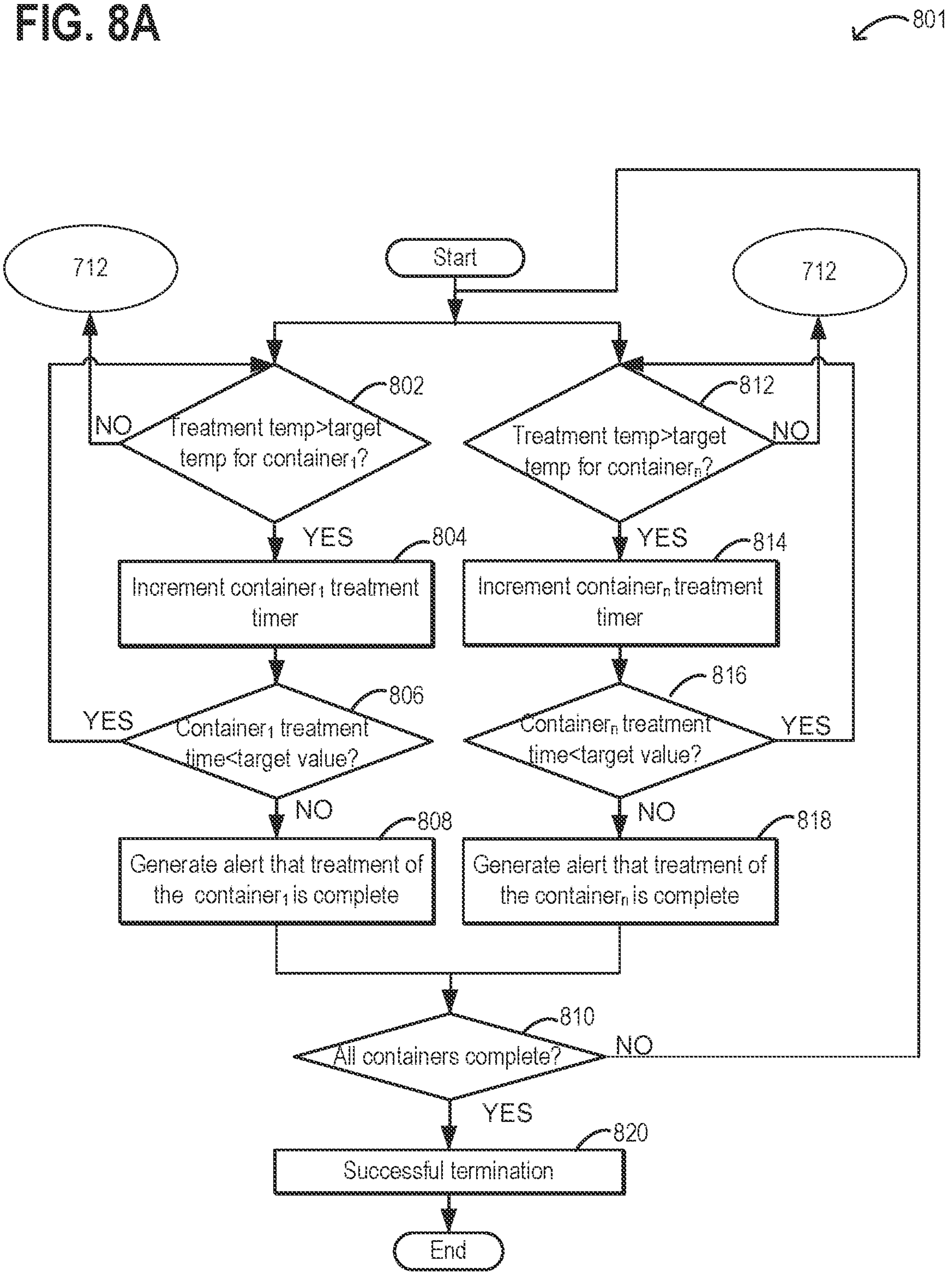
FIG. 8A shows a flow chart of an eleventh method, according to one or more examples of the present disclosure.
Figure 8B:
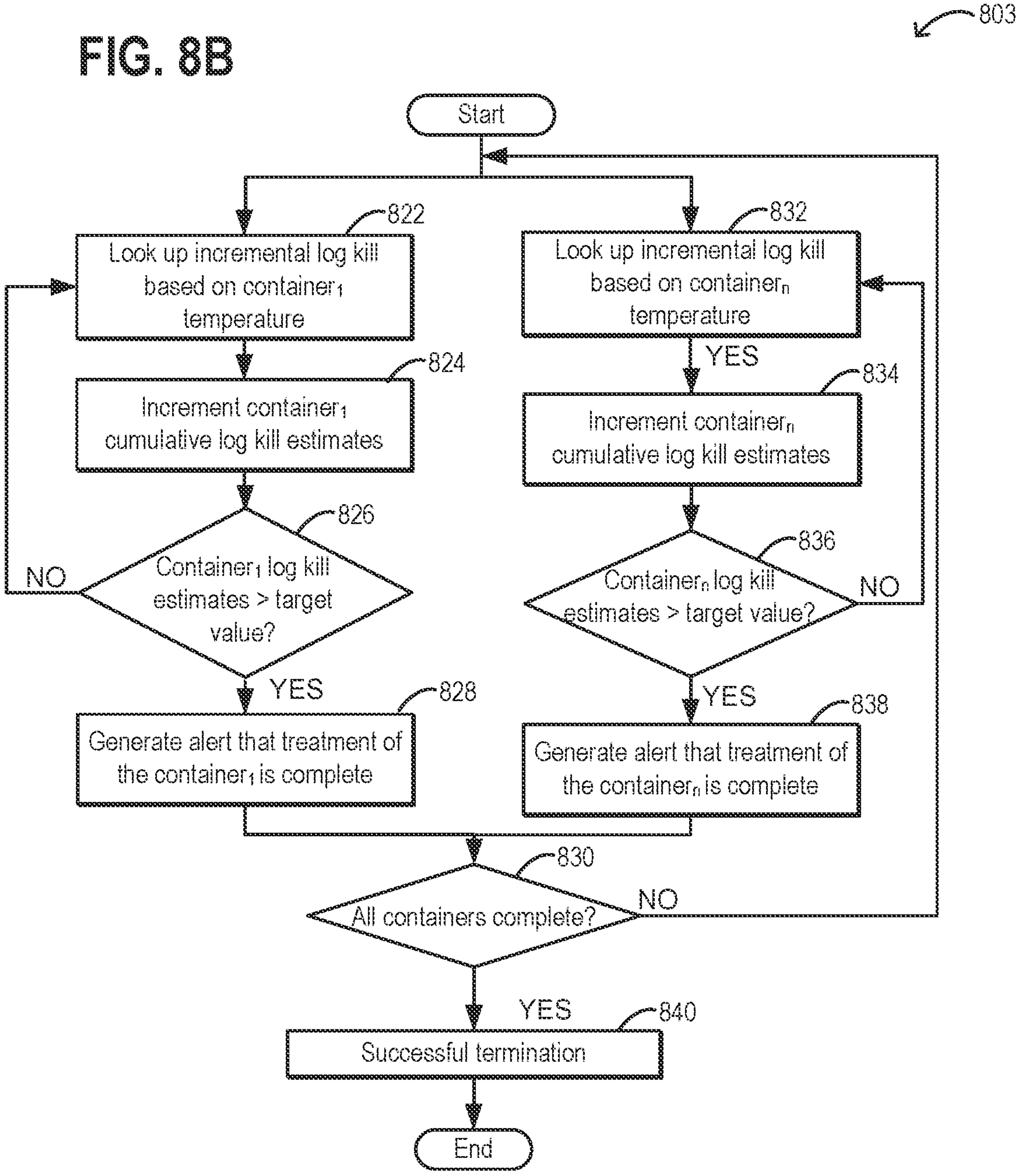
FIG. 8B shows a flow chart of a twelfth method, according to one or more examples of the present disclosure.

Determining whether or not treatment is complete may include one or more of the steps discussed at FIG. 8A and FIG. 8B. Turning briefly to FIG. 8A, FIG. 8A shows an example method 801 for determining whether or not treatment is complete. Step 802 of method 801 includes determining whether the treatment temperature is greater than a target temperature for a first container (containers), where the treatment temperature and the mode for determining the treatment temperature is specific to each container. Details as to the modes that may be used for determining the treatment temperature may be found at least at FIG. 12A-FIG. 12F. For example, if the mode for the treatment temperature of a container is a minimum mode, then the minimum probe reading of the probes inserted into that container is used to determine the treatment temperature within that particular container. In other examples, if there is only one probe in a container, then that probe reading is equal to any of the minimum, maximum, or average probe reading.

It is noted that the target temperature refers to a temperature at which the product of the first container is desired to be heated at. In at least one example, the target temperature may be varied throughout the treatment process. It is noted that the branch of method 801 starting at step 812 is started simultaneously with the branch that starts at step 802. The branch of method 801 that starts at step 812 is a monitoring process that is carried out when more than one container is undergoing the RF treatment from method 701 at the same time. That is, the branch that starts at step 812 is carried out in examples where there are n number of containers in addition to the first container.

Turning back now to step 802, if the treatment temperature is less than or equal to the target temperature for the first container, then method 801 moves back to step 712. If the treatment temperature is greater than the target temperature for the first container, then method 801 includes incrementing a treatment timer for the first container at step 804. Method 801 then includes determining whether the first container treatment time is less than a target value treatment time for the first container at step 806. If the first container treatment time is less than the target value time for the first container at step 806, then method 801 moves back to step 802. If the first container treatment time is equal to or greater than the target value time for the first container at step 806, then method 801 generates an alert that treatment of the first container is complete at 808.

After step 808, it is determined whether or not all of the containers are complete at step 810. That is, it is determined whether or not all of the containers have completed treatment. If all of the containers have been complete, then method 801 includes indicating a successful termination at step 820. Responsive to such successful termination at step 820, method 701 further may include determining treatment is complete at step 718 and then ending method 701.

If it is determined that not all containers are complete at step 810, method 801 may include continuing to perform similar steps for one or more additional containers (container$_n$) at 812, 814, 816, 818, as 802, 804, 806, 808, respectively. However, it is noted that the particular target treatment temperature and target value time for the additional container may differ from the first container. That is, each container may have a different set of run parameters specific to the characteristics of that particular sample.

Additionally or alternatively, the determination as to whether the treatment is complete at step 718 may include one or more steps of method 803 described at FIG. 8B. Turning to FIG. 8B, method 803 includes looking up an incremental log kill based on the first container (containers) temperature at step 822. The lookup may additionally be dependent on the product's initial moisture and other characteristics. It is noted that the branch starting at step 832 of method 803 is carried out when more than one container is undergoing the RF treatment from method 701 at the same time. That is, the branch that starts at step 832 is carried out in examples where there are n number of containers in addition to the first container.

Similar to FIG. 8A, it is noted that the branch of method 803 starting at step 822 is carried out simultaneously as the branch of method 803 starting at step 832. Thus, although the branch starting at step 822 is described first, these steps are occurring simultaneously with the steps being carried out in the branch starting at step 832.

Following step 822, method 803 includes incrementing the first container cumulative log kill estimates at step 824. At step 826, method 803 includes determining whether the first container log kill estimates are greater than a target value log kill for the first container.

It is noted that log kill estimates for microbial kill/inactivation may be based on thermal death time curves, in at least one example. Mathematical models may be used to describe these kinetic behaviors and used for analysis and prediction, in at least one example. Many different types of equipment have been developed for experimentally determining the parameters used in these models, for various kinds of foods, in liquid, powder, semi-solid, solid forms, etc. for various modes of thermal treatment, such as hot air, hot water, hot oil. However, it is much more difficult to conduct such experimental measurements for thermal inactivation in RF heating, especially for lumpy product such as cannabis, as opposed to more uniform product, like flour and cookie dough.

In at least one example, a thermal death model involving two parameters may be used to look up the incremental log kill at step 822. The two parameters may be a D-value and a z-value. The D-value is a number in minutes that is referenced to a particular temperature. E.g., a $D_{80}$ value of 5 minutes means that at 80° C., the population of a particular pathogen is reduced to $1/10^{th}$ of the original size in 5 minutes. "D" stands for Decimal Reduction Time. The z-value is the amount of temperature increase such that at that higher temperature, the D-value will be 1/10th of its original value. Thus a z-value of 8 C (that is, a temperature difference of 8° C.), together with the earlier example of $D_{80}$=5 minutes, means that $D_{88}$=0.5 minutes.

In order to predict log kill under RF, the D and z-values for each of the various pathogens targeted (yeasts and molds, Coliforms, *E. coli, Salmonella, Aspergillus* species, etc.) a parameter estimation approach may be used. The parameter estimation approach may be developed based on log kill results for historical data from running RF on the product (e.g., cannabis), collecting pre-RF and post-RF microbial samples, and collecting data on the temperature time history at each of the samples under RF. By using this historical data, along with the most common microbial death time model, best fit values for D and z-value may be calculated as a function of product moisture (e.g., cannabis moisture) and potentially one or more secondary factors. The product moisture may be received at step 400, in at least one example.

Using the fitted values for D-value, z-value, and optionally the one or more secondary models, in real time, based on knowing the moisture of the product (e.g., cannabis), a temperature at each probe reading, and any other optional secondary variables, the log kill achieved so far during the RF process can be estimated. Once the estimated log kill has reached the target value for all probe positions (e.g., "YES" at step 826), then the process can be considered complete. It is noted that the target value may have a margin included to be higher than a requested log kill. Such a margin may help to ensure that the target value log kill is met throughout the entire product.

If the first container log kill estimates are less than the target value log kill for the first container, then method 803 moves back to step 822. If the first container log kill estimates are greater than or equal to the target value log kill for the first container at step 826, then method 803 includes generating an alert that treatment of the first container is complete at step 828. Following step 828, method 803 includes determining whether all of the containers are complete at step 830. If all of the containers are determined to be complete at step 830, then method 803 includes indicating a successful termination at step 840. Responsive to such successful termination at step 840, method 701 may include determining that treatment is complete at step 718 and then ending method 701. Responsive to an alert that treatment of the first container is complete at step 828, a user may pause the RF process, open the chamber door 26A and remove the first container to avoid overprocessing the product. The user may similarly remove other containers in response to an alert at step 838.

If it is determined that not all containers are complete at step 830, method 803 may include performing similar steps for an additional container (container$_n$) at 832, 834, 836, 838, as 822, 824, 826, 828, respectively. However, it is noted that the particular target log kill value may differ from the first container. That is, each container may have a different set of run parameters specific to the characteristics of that particular sample.

In one example, steps 712 and 718, monitoring treatment temperature and checking for treatment completion, may be carried out during the first stage, simultaneously with step 706. For example, treatment timers may begin to increment before the system has entered the second stage. Furthermore, in at least one example, equilibration may also begin before the system has entered the second stage. In this way, it is noted that equilibration may be carried throughout the run.

Turning back now to FIG. 7, as mentioned previously, while the monitor treatment temperature branch (path starting at 712) is running, method 701 further includes monitoring temperature spread and initializing the equilibration flag to "FALSE" at step 714, and monitoring control temperature at step 716 as a part of the feedback control. That is, in one example, as a part of the cascaded PID control.

Looking first to monitoring a temperature spread and initializing the equilibration flag to "FALSE" at step 714, it is noted that there may be multiple temperature probes (e.g., six temperature probes) inserted into a product to measure a temperature at various locations of the product, in at least one example. If the spread of temperatures across the probes (e.g., based on standard deviation threshold spreads across the probes, maximum reading minus minimum reading, etc.) exceeds a specified value, then it may be determined that a temperature spread is greater than an upper temperature spread threshold at step 720 and RF heating may be stopped at step 722 by turning off the RF power. When the temperature spread is determined to be greater than the upper temperature spread threshold at step 720, the equilibration flag further is set to "TRUE" at step 722 as the system is now in an equilibration state. Otherwise, method 701 moves back to 714. Additionally or alternatively, a contactless temperature monitoring approach may be implemented, as discussed above to determine the temperature spread. Further, in at least one example, it is noted that the temperature spread may be determined across multiple containers rather than a single container. That is, in a case where there may be multiple containers (bags) simultaneously undergoing treatment within the same RF chamber, temperature readings across the multiple containers may be used to monitor the RF process. In another example, temperature spread may be monitored on a container by container basis, e.g., each container's probes are monitored for the spread between the highest and lowest probe readings.

After turning off the RF power at step 722, an equilibration timer is incremented at step 724. If the equilibration timer is greater than a timer threshold at step 726, then method 701 includes terminating the method with a failure at 728 and the method ends. If the equilibration timer is less than the timer threshold at step 726, then method 701 includes determining whether or not the temperature spread is less than a resumption threshold at step 730. It is noted that the temperature spread of the resumption threshold may be different than the upper temperatures spread threshold in at least one example.

If the temperature spread is not greater than the resumption threshold at step 730, then method 701 includes setting the equilibration flag back to "FALSE" and turning on the RF power again at step 732, and then moving back to step 714. If the temperature spread is still greater than the resumption threshold at step 730, then method 701 includes moving to step 724 to increment the equilibration timer.

In this way, once the spread has lowered to a specified value (which is smaller than the limit at which RF heating is paused), RF heating is resumed, provided that the control temperature is below the upper bound at which RF heating is paused. It is noted that such RF pausing is part of the equilibration process, which may be carried throughout the run including before and/or during the second stage.

Turning now to 716, the control temperature is monitored at 716. If it is determined that the control temperature is not greater than an upper control temperature threshold at step 734, then method 701 moves back to 716. If it is determined that the control temperature is greater than the upper control temperature threshold, then method 701 includes turning off the RF power at step 736. Once the RF power is turned off at step 736, method 701 includes determining whether the control temperature is less than a lower control temperature threshold at step 738. If the control temperature is not less than the lower control temperature threshold at step 738, then method 701 includes continuing to monitor the control temperature until the control temperature is less than the lower control temperature threshold.

Responsive to the control temperature being less than the lower control temperature threshold at step 738, method 701 includes determining whether the equilibration flag is FALSE at step 740. If the equilibration flag is FALSE at step 740, method 701 includes turning on the RF power at step 742 and then moving back to 716. However, if the equilibration flag is TRUE at step 740, then method 701 goes back to 716 without turning on the RF power. That is the RF power is maintained in an off state.

The presence of multiple probes makes possible a number of choices for how temperature is controlled. It is possible to select the maximum probe reading as the control temperature (e.g., the temperature sent to the controller for comparison with a target value). It is also possible to select the average or minimum probe readings, to provide flexibility in operating the control system. As noted at table 1200, there are various strategies possible.

A treatment temperature can be defined as the minimum probe reading (or any other function of the multiple probe readings). By selecting the minimum probe reading as the treatment temperature, one is assured that all measured portions of the product are above a certain temperature suitable for microbial reduction. The treatment temperature may be used to increment a treatment clock.

When all points are above the specified treatment temperature target, a treatment timer starts to count the amount of time under treatment. This treatment clock is paused whenever the treatment temperature falls below the specified target.

In addition, it is possible to specify that the treatment timer counts time only when RF power is turned on. Additionally, it is possible to specify that the treatment timer counts time when both RF power is turned on and treatment temperature is above the specified target.

Treatment timers may be applied on a per container basis. For example, when treating multiple bags in the same process run, it may be possible to apply a separate treatment timer for each container, based on the specific temperature probes that have been inserted into the container. Once a container has reached the prescribed treatment time, a notification is issued on the human machine interface (HMI) display (e.g., display 37) alerting the operator to the container's treatment completion. The operator can remove the container and then resume processing of the remaining containers or opt to continue processing (e.g., if the timers for the other containers are close to completion as well).

Figure 10:
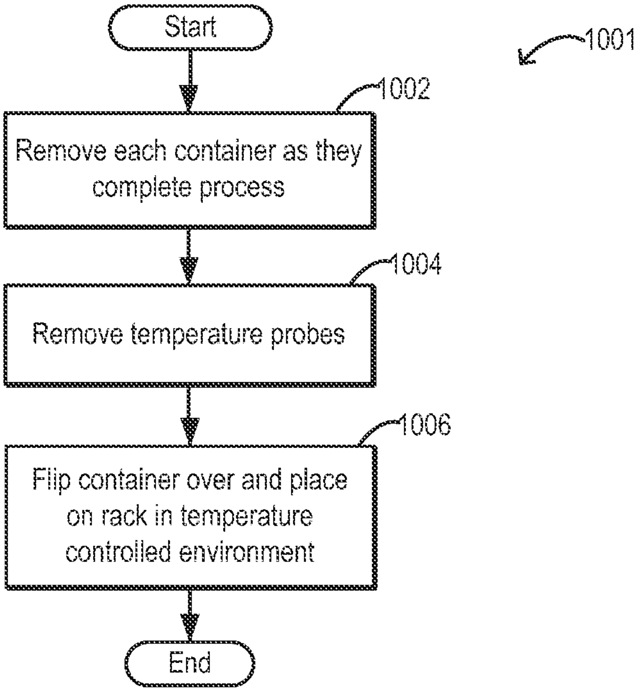
FIG. 10 shows a flow chart of a fourteenth method, according to one or more examples of the present disclosure.

Turning back now to FIG. 2, after controlling the RF heating profile at step 600 and tracking the treatment progress at step 700 (e.g., the treatment tracking discussed at FIG. 8A and FIG. 8B), method 201 includes performing a cooling process at step 800. An example cooling process method 1001 is shown at FIG. 10. In method 1001, the cooling process may include removing each container as they complete their processing at step 1002. Then, after step 1002, method 1001 includes removing the temperature probes at step 1004, and flipping the container over and placing the container on a rack in a temperature controlled environment at step 1006 to allow for cooling of the product following treatment.

Figure 11A:
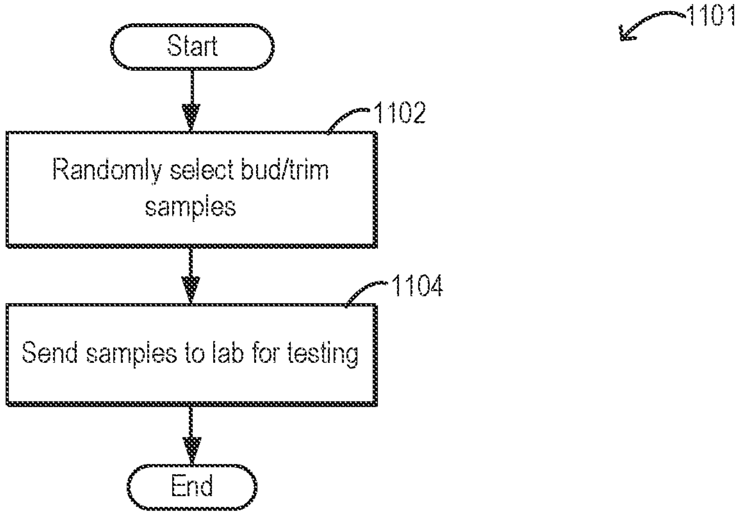
FIG. 11A shows a flow chart of a fifteenth method, according to one or more examples of the present disclosure.

After performing the cooling at step 800, method 201 may include receiving a post-run quality and microbial testing at step 900. As illustrated at FIG. 11A and at FIG. 11B, the post-run quality and microbial testing results may be received from a lab in at least one example. For example, looking to method 1101 at FIG. 11A, the post-run quality and microbial testing results process may include randomly selecting bud and/or trim samples that were processed at step 1102. In cases where the product processed was not cannabis, then other random samples of the product may be selected. The randomly selected samples from 1102 may then be sent to a lab for testing at step 1104. In at least one example, the results of the lab testing may be received at the controller of the RF machine that carried out the treatment. Additionally or alternatively, the results may be uploaded to a cloud-based server which may be used to make any necessary updates to run parameters, for example. Further, in at least one example, the results may be sent to a user computing device.

Figure 11B:
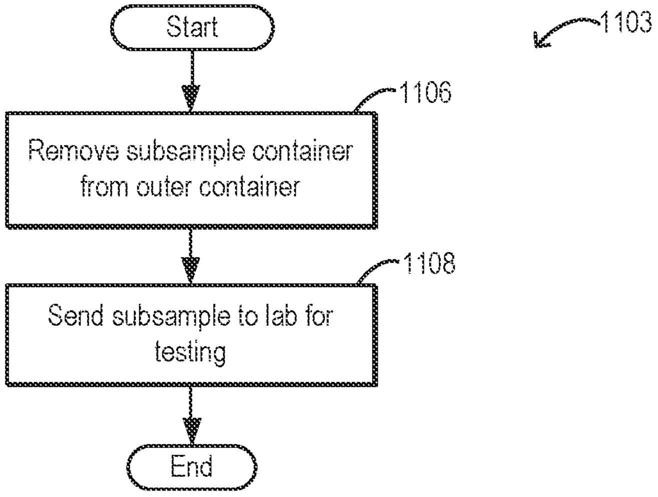
FIG. 11B shows a flow chart of a sixteenth method, according to one or more examples of the present disclosure.

Similarly to FIG. 11A, method 1103 at FIG. 11B includes removing a subsample container from an outer container at step 1106 (e.g., removing a subsample pouch from an outer bag). The removed subsample may then be sent to a lab for testing at step 1108. Similarly to method 1101, in at least one example the results of the lab testing at step 1108 may be received at the controller of the RF machine that carried out the treatment. Additionally or alternatively, the results may be uploaded to a cloud-based server which may be used to make any necessary updates to run parameters, for example. Further, in at least one example, the results may be sent to a user computing device.

In at least one example, a formula for predicting an amount of decarboxylation of THCA into Delta-9 THC upon undergoing RF treatment may be stored in the controller. Inputs may be received at the controller to provide an initial product moisture, temperature time history, and RF power time history. Additional predictive formulas for other variables of interest, such as terpene loss, log kill estimates for various pathogens, including *E. coli, Salmonella, Aspergillus*, etc may also be included in at least one example. All of these predictive formulas may include temperature time history and potentially RF power history as part of the prediction formulas.

Via one or more of these predictive formulas, it is possible to customize treatment parameters: RF power level, target temperature, and duration of treatment in order to accommodate the user's preference. For example, if the user cares about high throughput and terpene loss, but not decarboxylation, and wants to meet regulatory requirements for *Aspergillus* with product that has an initial count of 10,000 CFU/g, then an optimization algorithm can be employed to minimize a performance index comprising terms related to treatment time and predicted terpene loss, with a constraint on log kill for *aspergillus* being higher than the amount needed to meet regulatory requirements. The various terms in the performance index may be weighted in accordance to the relative importance among such terms. There may be a number of function optimization algorithms to achieve such desired optimization.

While the most common treatment mode is to raise temperature to a fixed target and then hold the temperature for a specified amount of time, it may be possible to manipulate the entire profile such that there are a multitude of temperatures and different hold times. Such an approach may be particularly beneficial if the dependencies of the performance metrics (decarboxylation, terpene loss, log kill) are a nonlinear function of the manipulated variables (time, temperature, RF power). In this approach, the performance index would comprise terms involving the time integral of terms that contribute to predicted quality, and predicted log kill, where the function within the integral are dependent on the temperature profile and RF profile. There are a number of functional optimization algorithms that one can select from, to achieve such desired optimization. It is noted that the second treatment stage feedback control (e.g., PID control) may be used to control such profiles where there are a multitude of temperatures and different hold times.

The optimization calculation may be carried out via a computing device that is separate from the RF system. The results may then be transferred to the RF system controller once optimization has completed, to provide parameters to RF system for controlling the treatment process. The parameters would be stored in the controller of the RF system for recall when the desired process is utilized for a process run. Alternatively, in at least one example the optimization calculation may be carried out via the controller on board the RF system.

In another embodiment, where the desired run parameters may differ from run to run, the process parameters may be determined on demand. Thus, the desired run parameters may be determined for each container. In this situation, the desired run preferences may be specified via the HMI panel of the RF system (e.g., HMI 39) via one or more of the approaches discussed at step 400. The preferences and product characteristics (weight, number of bags, initial moisture, initial microbial counts, initial terpenes and initial THCA, Delta-9 THC levels) may be entered via the HMI panel of the RF system. This information may then be communicated to a remote computer server, and the customization calculation carried out on such remote server. The resulting run parameters may then be communicated back to the controller of the RF system, after which the customer may proceed with the run.

In yet another embodiment, the RF system may be augmented with computing power at the controller that allows the optimization calculations to be carried out within the RF system. Such calculations may potentially be an emulation of the optimization calculation in order to reduce computational requirements. Such calculations may be merely a set of table lookups and interpolations between similar, adjacent parameter sets.

There are many parameters that control the operation of the RF treatment system for treating cannabis and other products. For example, feedback gains for controllers (e.g., feedback controllers such as PID controllers) affect the response time, ability to track specified temperature, and amount of overshoot. The ramp rate for RF power affects the amount of temperature spread (non-uniformity) in the product. The electrode height affects the RF power absorption dynamics, in some cases exhibiting a resonant oscillatory behavior. Thus, in at least one example, a machine learning algorithm may be integrated into the RF system to collect information on all of the relevant control inputs, all of the contributory factors, correlate with important behavior characteristics, differentiating between desirable behaviors, such smooth temperature rates, reduced temperature spread, and then determining the optimal set of control parameters. For example, the machine learning algorithm may be included in the controller or in a remote computing device communicatively coupled with the controller, for example.

Thus, provided herein is a system and methods for RF processing in a manner that improves accuracy and efficiency in meeting desired treatment results, while simplifying the user experience.

A first approach may be a method comprising, in a first treatment stage, applying RF power at a first power level until a first target temperature is reached, wherein the first target temperature is less than a final target temperature; responsive to the reaching the first target temperature, transitioning to a second treatment stage, and varying application of the RF power via feedback control in the second treatment stage until final target temperature is achieved. In a first example for the first approach, the feedback control may include monitoring a treatment temperature, a temperature spread, and a control temperature. In a second example for the first approach, which may optionally include the first example for the first approach, the RF power applied in the second treatment stage is paused responsive to determining a temperature variation across a plurality of probes. In a third example for the first approach, which may optionally include one or more of the first and second examples for the first approach, the temperature variation is a temperature spread, and wherein the RF power applied in the second stage is paused responsive to determining that the temperature spread is greater than an upper temperature spread threshold. In a fourth example for the first approach, which may optionally include one or more of the first through third examples for the first approach, the temperature spread is a difference between a minimum temperature reading of the plurality of probes and a maximum temperature reading of the plurality of probes. In a fifth example for the first approach, which may optionally include one or more of the first through fourth example approaches, the temperature spread may be determined to be greater than the upper temperature spread threshold responsive to at least one temperature reading of the plurality of probes being greater than a threshold number of standard deviations from an average temperature reading. In a sixth example for the first approach, which may optionally include one or more of the first through fifth examples for the first approach, the method may further comprise determining that an amount of time incremented by the equilibration time is greater than or equal to a time threshold. In a seventh example for the first approach, which may optionally include one or more of the first through sixth examples, the RF power applied in the second treatment stage is paused responsive to determining that a control temperature is greater than an upper control temperature threshold. In an eighth example for the first approach, which may optionally include one or more of the first through seventh examples for the first approach, pausing the RF power applied in the second treatment stage includes turning off the RF power. In a ninth example for the first approach, which optionally includes one or more of the first through eighth examples for the first approach, the RF power is paused in the second treatment stage responsive to determining that the control temperature is greater than the upper control temperature threshold is maintained paused until both the control temperature is less than a lower control temperature threshold and equilibration flag is set to false. It is noted that any of the example methods described herein may be carried out via the RF treatment system examples provided herein, such as the system described at FIG. 1 and the RF treatment systems described in the additional approaches discussed below. For example, the method steps may be stored as instructions in non-transitory memory of the controller of the RF system, and the method steps may be carried out based on one or more sensor outputs of the RF system and controlling one or more actuators of the RF system. It is noted that features from any of the different example approaches discussed herein may be combined with each other.

Continuing, in a second approach an RF treatment system may comprise: a first electrode assembly; a second electrode assembly; an RF generator coupled to both the first electrode assembly and the second electrode assembly; one or more temperature sensing devices; and a controller, the controller including instructions stored in non-transitory memory to: in a first treatment stage, apply RF power at a first power level until a first target temperature is reached, wherein the first target temperature is less than a final target temperature; responsive to the reaching the first target temperature, transition to a second treatment stage, and vary application of the RF power via feedback control in the second treatment stage until desired treatment conditions are achieved.

In a first example of the second approach, the system may further comprise a motor coupled to the first electrode assembly, wherein, in the first treatment stage, a position of the first electrode assembly is adjusted via actuation of the motor, wherein the first electrode assembly is adjusted towards or away from the second electrode assembly via the motor. In a second example of the second approach which optionally includes the first example of the second approach, the controller stops application of the RF power based on an equilibration timer reaching a timer threshold. In a third example of the second approach which optionally includes one or more of the first and second examples of the second approach, the controller stops application of the RF power responsive to an estimated log kill being equal to or greater than a threshold log kill. In a fourth example of the second approach which optionally includes one or more of the first through third examples of the second approach, the estimated log kill is based on one or more of a temperature output and time. In a fifth example of the second approach, which optionally includes one or more of the temperature output is based on one or both of temperature probe outputs and contactless temperature sensing outputs. In a sixth example of the second approach, which optionally includes one or more of the first through fifth examples, the time is an amount of time incremented when the temperature output predicts a temperature of product being treated to be greater than a target treatment temperature for the product. Further, the first electrode assembly and the second electrode assembly may be part of a first RF chamber, and a third electrode assembly and a fourth electrode assembly may be part of a second RF chamber that is positioned downstream of the first RF chamber, wherein the first RF chamber and the second RF chamber are connected via a conveyor belt.

In a third approach, a method may comprise: receiving outputs from a plurality of temperature probes; ranking the plurality of temperature probes based on the outputs received; calculating a difference in the outputs between immediately adjacent ranked temperature probes; and disabling one or more temperature probes based on the calculation. In a first example of the third approach, disabling the one or more temperature probes includes continuing to receive outputs from the one or more disabled temperature probes, and disregarding the outputs received from the one or more disabled temperature probes for controlling one or more run parameters of an RF treatment run. While ranking is one potential approach for determining which temperature probes to use, it is noted that other approaches are possible. For example, statistical values such as the mean and the standard deviation may be computed and the highest and lowest temperature probe values may be compared against these statistical values. As an example, if the highest temperature probe reading is two or more standard deviations from the mean, then the highest temperature probe may be a candidate for de-selection. Other statistical approaches may be used in the de-selection process without departing from the scope of this disclosure.

In a fourth approach, a method, may comprise: receiving prepared material in an RF chamber, wherein the prepared material includes one or more temperature probes positioned therein; determining one or more desired run parameters for the prepared material; starting an RF process based on the desired run parameters; and controlling an RF heating profile of the prepared material during the RF process. In a first example of the fourth approach, determining the desired run parameters for the prepared material includes receiving a recipe selection from a set of recipes, wherein the one or more run parameters are associated with the selected recipe. In a second example of the fourth approach, which optionally includes the first example of the fourth approach, determining the desired run parameters for the prepared material includes receiving one or more product characteristics and one or more treatment targets for the prepared material. In a third example of the fourth approach, which optionally includes one or more of the first and second examples of the fourth approach, the one or more run parameters are calculated based on the one or more product characteristics and the one or more treatment targets received. In a fourth example of the fourth approach, which optionally includes one or more of the first through the third examples of the fourth approach, the one or more product characteristics include one or more of a product type, a product weight, and a product moisture content, and the one or more treatment targets received include one or more of a target microbe, protection of one or more product chemicals, and a target moisture content. In a fifth example of the fourth approach, which optionally includes one or more of the first through fourth examples of the fourth approach, determining the desired run parameters for the prepared material includes receiving the one or more run parameters directly via a manual input.

In a fifth approach, a method may comprise: via a human machine interface (HMI) of an RF device, providing a plurality of treatment run intensities for selection; receiving a user input selecting a treatment run intensity of the plurality of treatment run intensities; and carrying out an RF treatment run associated with the selected treatment run intensity, wherein carrying out the RF treatment run includes generating RF waves in an RF chamber based on parameters of the RF treatment run. In a first example of the fifth approach, a log kill is estimated while the RF treatment run is being carried out, and wherein the RF treatment run is terminated responsive to the log kill reaching a log kill threshold. In a second example of the fifth approach, which may optionally include the first example, the method may further comprise receiving a user input indicating one or more product characteristics, and carrying out the RF treatment run associated based on both the selected treatment run intensity and the one or more indicated product characteristics. In a third example of the fifth approach, which may optionally include one or both of the first and second examples of the fifth approach, the one or more product characteristics include a product type. In a fourth example of the fifth approach, which may optionally include one or more of the first through third examples of the fifth approach, the log kill threshold is adjusted based on the one or more product characteristics. In a fifth example of the fifth approach, which may optionally include one or more of the first through fourth examples of the fifth approach, a model used for estimating the log kill while the heating profile is being carried out is based on the one or more product characteristics. In a sixth example of the fifth approach, which may optionally include one or more of the first through fifth examples of the fifth approach, one or more of time and temperature RF treatment parameters for the RF treatment run are based on both the selected treatment run intensity and the one or more indicated product characteristics. In a seventh example of the fifth approach, which may optionally include one or more of the first through sixth examples of the fifth approach, the plurality of treatment run intensities include a gentle run intensity, a normal run intensity, and an aggressive run intensity. In an eighth example of the fifth approach, which may optionally include one or more of the first through seventh examples of the fifth approach, the RF chamber is a first RF chamber, and wherein carrying out the RF treatment run includes transporting product undergoing the RF treatment run in the first RF chamber to a second RF chamber. In a ninth example of the fifth approach, which may optionally include one or more of the first through eighth examples of the fifth approach, the RF treatment run is continued at the second RF chamber, and wherein RF waves are generated in the second RF chamber after receiving the product.

In a sixth approach, a method may comprise: determining one or more run parameters for an RF process based on one or more user inputs; starting the RF process, wherein starting the RF process includes treating a product with RF waves; estimating a log kill of the product during the RF process; and terminating the RF process responsive to the estimated log kill reaching the log kill threshold. In a first example of the sixth approach, the log kill is estimated based on a temperature of the product. In a second example of the sixth approach, which may optionally include the first example, the temperature of the product used for estimating the log kill is an estimated minimum temperature of the product. In a third example of the sixth approach, which optionally includes one or more of the first and second examples of the sixth approach, the log kill is further estimated based on an initial moisture content of the product. In a fourth example of the sixth approach, which optionally includes one or more of the first through third examples of the sixth approach, the RF process includes monitoring a temperature spread during the RF process and pausing generation of the RF waves responsive to the temperature spread exceeding an upper temperature spread threshold. In a fifth example of the sixth approach, which optionally includes one or more of the first through fourth examples of the sixth approach, the temperature spread is a difference between a maximum temperature reading and a minimum temperature reading for the product at a same point in time.

Note that the example control and estimation routines included herein can be used with various RF devices and/or RF system configurations. The control methods and routines disclosed herein may be stored as executable instructions in non-transitory memory and may be carried out by the control system including the controller in combination with the various sensors, actuators, and other RF hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied other RF system types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:

determining one or more run parameters for an RF treatment based on one or more user inputs;

starting the RF treatment, wherein starting the RF treatment includes treating a product positioned within an RF chamber with RF waves;

estimating a log kill of the product during the RF treatment; and terminating the RF treatment responsive to the log kill reaching a log kill threshold.

2. The method of claim 1, wherein the log kill is estimated based on a temperature of the product.

3. The method of claim 2, wherein the temperature of the product used for estimating the log kill is an estimated minimum temperature of the product.

4. The method of claim 2, wherein the log kill is further estimated based on an initial moisture content of the product.

5. The method of claim 1, wherein the RF treatment includes monitoring a temperature spread during the RF treatment and pausing generation of the RF waves responsive to the temperature spread exceeding an upper temperature spread threshold.

6. The method of claim 1, wherein the product is positioned in a bag.

7. The method of claim 6, wherein the bag is positioned within a processing tray comprising one or more holes.

8. An RF system, comprising:

a first electrode assembly;

a second electrode assembly;

an RF generator coupled to both the first electrode assembly and the second electrode assembly;

product positioned between the first electrode assembly and the second electrode assembly in an RF chamber;

one or more temperature sensing devices positioned within the RF chamber; and a controller, the controller including instructions stored in non-transitory memory to:

treat the product positioned within the RF chamber with RF waves as part of an RF treatment;

estimate a log kill of the product during the RF treatment; and terminate the RF treatment responsive to the log kill of the product reaching a log kill threshold.

9. The RF system of claim 8, wherein the log kill threshold is determined based on one or more run parameters, wherein the one or more run parameters are based on user input.

10. The RF system of claim 8, wherein the log kill is an incremental log kill that is based on an amount of time that a particular temperature has been maintained.

11. The RF system of claim 10, wherein the log kill threshold for the product is reached when all positions for the one or more temperature sensing devices are determined to have reached the log kill threshold.

12. The RF system of claim 8, wherein the product is positioned in a bag, and wherein the bag is elevated away from the second electrode assembly within the RF chamber via a tray, wherein the second electrode assembly is positioned below the product.

13. A method, comprising:

determining one or more run parameters for an RF treatment based on user input, and starting the RF treatment;

during the RF treatment, generating RF waves and treating a product positioned within an RF chamber with the RF waves;

determining a temperature spread of the product is greater than a threshold and pausing generation of the RF waves; then determining the temperature spread of the product is less than a resumption threshold and resuming generation of the RF waves;

estimating an incremental log kill for the product has reached a log kill threshold; and terminating the RF treatment responsive to the incremental log kill reaching the log kill threshold.

14. The method of claim 13, wherein the one or more run parameters include a target value log kill, and wherein the log kill threshold is higher than the target value log kill.

15. The method of claim 13, wherein the one or more run parameters include a target pathogen and a population of the target pathogen.

16. The method of claim 15, wherein the incremental log kill is estimated is based on a D-value, wherein the D-value is a number representative of an amount of time referenced to a particular temperature to reduce the population of the target pathogen to $1/10^{th}$ of the population.

17. The method of claim 16, wherein the incremental log kill is further estimated based on a z-value, wherein the z-value is a number representative of an increase to the particular temperature of the D-value, so that the D-value is reduced to $1/10^{th}$ of the D-value.

18. The method of claim 13, wherein the incremental log kill is estimated based on a temperature output, time, and a moisture content of the product.

19. The method of claim 17, wherein the product is positioned in a tray within the RF chamber, and wherein temperature outputs from one or more temperature probes positioned within the tray are used for estimating the incremental log kill.

20. The method of claim 19, wherein the temperature spread is based on the one or more temperature probes, and wherein the one or more temperature probes are a subset of all temperature probes within the tray.

* * * * *